(12) United States Patent
Tvrdy Benes et al.

(10) Patent No.: US 12,086,758 B2
(45) Date of Patent: Sep. 10, 2024

(54) HORIZONTAL TOOL STAGING SYSTEM AND TOOL STAGING ACCESSORIES WITH SECURE ENCLOSURE AND TOOL LOCATING CAPABILITIES

(71) Applicant: TVRDY 8, LLC, Omaha, NE (US)

(72) Inventors: Kelly E. Tvrdy Benes, Omaha, NE (US); Patrick G. Tvrdy, Ceresco, NE (US)

(73) Assignee: TVRDY 8, LLC, Omaha, NE (US)

( * ) Notice: Subject to any disclaimer, the term of this patent is extended or adjusted under 35 U.S.C. 154(b) by 486 days.

(21) Appl. No.: 17/086,438

(22) Filed: Nov. 1, 2020

(65) Prior Publication Data

US 2021/0129313 A1 May 6, 2021

Related U.S. Application Data

(60) Provisional application No. 62/973,904, filed on Nov. 1, 2019, provisional application No. 62/973,905, filed (Continued)

(51) Int. Cl.
*A47B 81/00* (2006.01)
*B25H 3/00* (2006.01)

(Continued)

(52) U.S. Cl.
CPC .......... *G06Q 10/087* (2013.01); *B25H 3/006* (2013.01); *B25H 3/04* (2013.01); *G06K 7/10475* (2013.01);

(Continued)

(58) Field of Classification Search
CPC . B25H 3/00; B25H 3/04; B25H 3/006; G06Q 10/087; G06K 7/10475;

(Continued)

(56) References Cited

U.S. PATENT DOCUMENTS 2,923,584 A    2/1960  Broderick, Jr.
3,275,394 A *  9/1966  Massinger ........... A47B 88/427
                                                    312/334.32

(Continued)

FOREIGN PATENT DOCUMENTS

CN          205600676 U  *  9/2016
GB            2465807 A  *  6/2010  ............... B25H 3/02
WO    WO-2017220148 A1  * 12/2017  ............... G01S 5/02

*Primary Examiner* — Kimberley S Wright
(74) *Attorney, Agent, or Firm* — Nasr Patent Law LLC; Faisal K. Abou-Nasr

(57) ABSTRACT

A securable vertical toolbox includes a vertically disposed frame, a plurality of wheels for transporting the vertically disposed frame, and a plurality of support panels configured to extend horizontally from the vertically disposed frame, each of the support panels including a peg board configured to support tool supporting fixtures. The securable vertical toolbox further includes an enclosure including a rear panel, a top panel, and two doors configured to surround the vertically disposed frame when the plurality of support panels are retracted into the vertically disposed frame and the two doors are secured, each of the two doors including a first panel configured to cover a side portion of the vertically disposed frame and a second panel configured to cover a front portion of the vertically disposed frame.

10 Claims, 45 Drawing Sheets

Related U.S. Application Data on Nov. 1, 2019, provisional application No. 62/973,902, filed on Nov. 1, 2019, provisional application No. 62/973,903, filed on Nov. 1, 2019, provisional application No. 62/973,906, filed on Nov. 1, 2019.

(51) Int. Cl.

| | | |
|---|---|---|
| *B25H 3/04* | (2006.01) | |
| *G06K 7/10* | (2006.01) | |
| *G06Q 10/00* | (2023.01) | |
| *G06Q 10/087* | (2023.01) | |
| *A47F 5/08* | (2006.01) | |
| *A47F 5/10* | (2006.01) | |
| *A47F 10/00* | (2006.01) | |

(52) U.S. Cl.
CPC ............. *A47F 5/0823* (2013.01); *A47F 5/108* (2013.01); *A47F 2010/005* (2013.01)

(58) Field of Classification Search
CPC .. A47F 5/108; A47F 5/0823; A47F 2010/005; E05B 65/46
See application file for complete search history.

(56) References Cited

U.S. PATENT DOCUMENTS

| | | | |
|---|---|---|---|
| 3,520,583 A | 7/1970 | Case | |
| 4,436,215 A * | 3/1984 | Kleinert | A47B 88/975 |
| | | | 312/263 |
| 4,577,773 A * | 3/1986 | Bitel | B25H 3/02 |
| | | | 206/561 |
| 4,733,703 A | 3/1988 | Cimino | |
| 4,893,884 A * | 1/1990 | Tsuchida | E05B 65/462 |
| | | | 312/107 |
| 4,976,450 A | 12/1990 | Ellefson | |
| 5,244,265 A | 9/1993 | Chiang | |
| 5,257,860 A | 11/1993 | Slivon | |
| 5,378,005 A | 1/1995 | Norton | |
| 5,443,311 A | 8/1995 | Kadlecek et al. | |
| 5,468,063 A | 11/1995 | Simonek | |
| 5,588,659 A | 12/1996 | Boes et al. | |
| 5,590,940 A | 1/1997 | Richard | |
| 5,634,649 A | 6/1997 | Breining et al. | |
| 6,374,649 B1 | 4/2002 | Holcomb et al. | |
| 6,499,608 B1 * | 12/2002 | Sterling | A47B 96/027 |
| | | | 211/70.1 |
| 6,834,767 B1 * | 12/2004 | Lin | B65D 73/0007 |
| | | | 206/349 |
| 6,850,208 B1 | 2/2005 | Ferrante | |
| 7,077,275 B2 * | 7/2006 | Kao | B65D 73/0021 |
| | | | 211/90.04 |
| 7,434,700 B2 * | 10/2008 | Kao | B25H 3/04 |
| | | | 206/464 |
| 7,665,809 B1 | 2/2010 | Giles et al. | |
| D636,599 S | 4/2011 | Hsu | |
| 7,963,533 B2 | 6/2011 | Bothun et al. | |
| 8,157,337 B2 | 4/2012 | Manalang et al. | |
| 8,162,330 B2 | 4/2012 | Melkumyan et al. | |
| 8,322,732 B2 | 12/2012 | McKay et al. | |
| 8,360,446 B1 | 1/2013 | Hertan | |
| 8,360,538 B2 | 1/2013 | Retchloff | |
| 8,668,209 B1 | 3/2014 | Anzivino et al. | |
| 8,944,444 B1 | 2/2015 | Tvrdy | |
| 10,455,200 B2 * | 10/2019 | Bashkin | G06V 40/172 |
| 10,579,873 B2 * | 3/2020 | Lipsey | G06K 7/10366 |
| 10,939,077 B2 * | 3/2021 | Bashkin | G07C 9/00896 |
| 11,129,474 B2 * | 9/2021 | Marriott | A47B 88/975 |
| 11,282,031 B1 * | 3/2022 | Butler | G06Q 10/087 |
| 2001/0028208 A1 | 8/2001 | Reilly | |
| 2002/0130598 A1 | 9/2002 | Schmidt | |
| 2005/0098516 A1 * | 5/2005 | Kao | A47F 7/0028 |
| | | | 206/372 |
| 2005/0110638 A1 * | 5/2005 | Mohr | B25H 3/00 |
| | | | 340/568.1 |
| 2007/0013280 A1 | 1/2007 | Retchloff | |
| 2008/0059338 A1 * | 3/2008 | Hubbard | G06Q 10/087 |
| | | | 705/28 |
| 2009/0072029 A1 * | 3/2009 | Martin | B25H 3/028 |
| | | | 235/385 |
| 2010/0046791 A1 * | 2/2010 | Glickman | G06V 10/56 |
| | | | 705/28 |
| 2010/0133213 A1 | 6/2010 | Kao | |
| 2010/0289626 A1 * | 11/2010 | Oberle | G06K 7/0008 |
| | | | 340/10.42 |
| 2012/0176008 A1 | 7/2012 | Grela et al. | |
| 2013/0250117 A1 * | 9/2013 | Pixley | B25H 3/00 |
| | | | 348/143 |
| 2016/0240025 A1 | 8/2016 | Bashkin | |
| 2016/0307150 A1 * | 10/2016 | Rogers | G06Q 10/08 |
| 2017/0215578 A1 | 8/2017 | Cole | |
| 2017/0249591 A1 * | 8/2017 | Bashkin | E05B 65/06 |
| 2018/0091782 A1 * | 3/2018 | Bashkin | G07C 9/00563 |
| 2018/0232577 A1 * | 8/2018 | Lipsey | G06V 20/00 |
| 2018/0309935 A1 * | 10/2018 | Bashkin | H04N 5/247 |
| 2019/0101463 A1 * | 4/2019 | Fly | B25B 23/14 |
| 2019/0255697 A1 | 8/2019 | Manalang et al. | |
| 2020/0014889 A1 * | 1/2020 | Bashkin | G07C 9/00563 |
| 2020/0275778 A1 * | 9/2020 | Marriott | A47B 88/975 |
| 2021/0160462 A1 * | 5/2021 | Bashkin | G06Q 10/087 |

\* cited by examiner

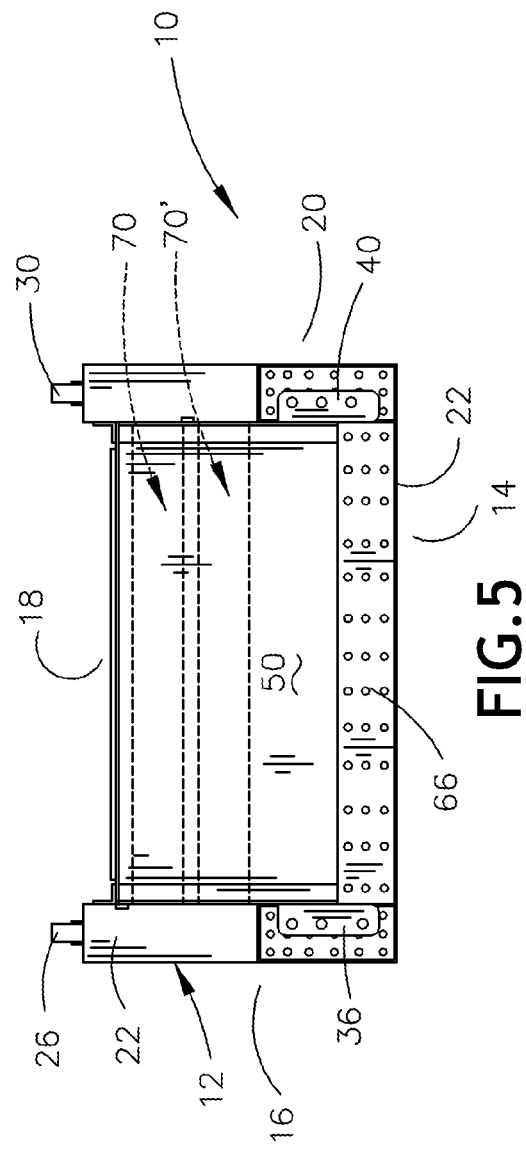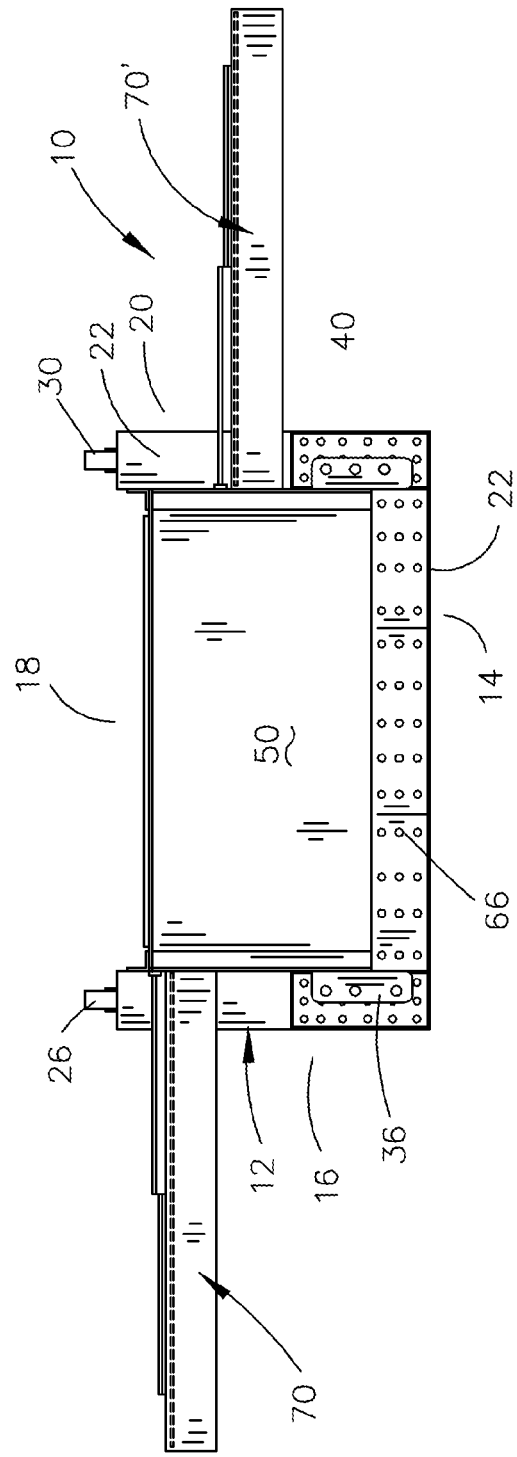

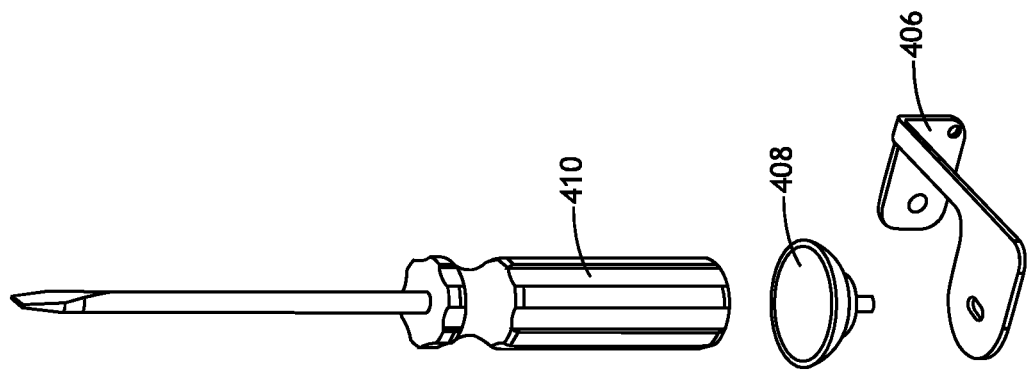

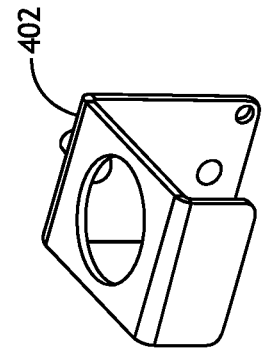
FIG.32B
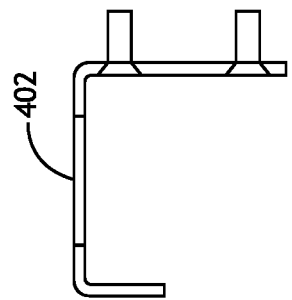
FIG.32D
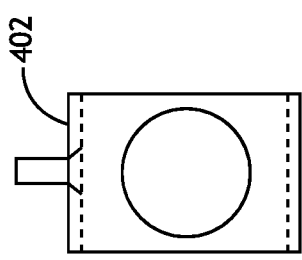
FIG.32A
FIG.32C

HORIZONTAL TOOL STAGING SYSTEM AND TOOL STAGING ACCESSORIES WITH SECURE ENCLOSURE AND TOOL LOCATING CAPABILITIES

CROSS-REFERENCE TO RELATED APPLICATIONS

The present application claims the benefit under 35 U.S.C. § 119(e) of U.S. Provisional Application Ser. No. 62/973,902, filed Nov. 1, 2019, and titled "HORIZONTAL TOOL STAGING SYSTEM WITH PHYSICAL AND ELECTRONIC SECURE ENCLOSURE WITH ELECTRONIC AND PHYSICAL TOOL INVENTORY CONTROL WITH LOST TOOL LOCATING CAPABILITIES," which is incorporated herein by reference in its entirety. The present application also claims the benefit under 35 U.S.C. § 119(e) of U.S. Provisional Application Ser. No. 62/973,903, filed Nov. 1, 2019, and titled "LINEAR ADJUSTABLE UNIVERSAL PNEUMATIC AND BATTERY DRIVEN DRIVER HOLDER," which is incorporated herein by reference in its entirety. The present application also claims the benefit under 35 U.S.C. § 119(e) of U.S. Provisional Application Ser. No. 62/973,904, filed Nov. 1, 2019, and titled "WALL MOUNTED INVERTED SCREWDRIVER OR SIMILAR HAND TOOL HOLDER," which is incorporated herein by reference in its entirety. The present application also claims the benefit under 35 U.S.C. § 119(e) of U.S. Provisional Application Ser. No. 62/973,905, filed Nov. 1, 2019, and titled "SPACE SAVING BOX-END WRENCH HOLDER," which is incorporated herein by reference in its entirety. The present application also claims the benefit under 35 U.S.C. § 119(e) of U.S. Provisional Application Ser. No. 62/973,906, filed Nov. 1, 2019, and titled "MULTI-POSITION WALL MOUNTED SHAFT-TYPE HAND TOOL HOLDER," which is incorporated herein by reference in its entirety.

TECHNICAL FIELD

The present disclosure relates to toolboxes and other systems for organizing and displaying tools and, more particularly, to a vertical toolbox operable as a horizontal tool staging system and to a secured enclosure, tool locating system, and tool staging accessories for the same.

BACKGROUND

Many types of toolboxes or tool chests have been developed over time to hold a variety of tool types, including, but not limited to, mechanic/technician hand tools, electronics, medical instruments, parts, and other hangable or stageable objects/devices. The most common type of toolbox or tool chest is a wheeled cabinet having a plurality of horizontally disposed and vertically spaced drawers which may be slidably pulled outwardly from the front of the cabinet. Other toolboxes or tool chests may have vertically disposed drawers that can be individually pulled upwardly from a cabinet.

Recently, vertical toolboxes were developed with the ability to horizontally stage tools so that they are easily seen and accessed. Yet, there exists a need for improved tool staging accessories to complement these horizontal tool staging systems. There also exists a need for improved means for enclosing vertical toolboxes and managing the tools stored therein.

SUMMARY

A securable vertical toolbox is disclosed. In embodiments, the securable vertical toolbox includes a vertically disposed frame, a plurality of wheels for transporting the vertically disposed frame, and a plurality of support panels configured to extend horizontally from the vertically disposed frame, each of the support panels including a peg board configured to support tool supporting fixtures. The securable vertical toolbox further includes an enclosure including a rear panel, a top panel, and two doors configured to surround the vertically disposed frame when the plurality of support panels are retracted into the vertically disposed frame and the two doors are secured, each of the two doors including a first panel configured to cover a side portion of the vertically disposed frame and a second panel configured to cover a front portion of the vertically disposed frame.

In some embodiments of the securable vertical toolbox, the first panel is perpendicular to the second panel.

In some embodiments of the securable vertical toolbox, the securable vertical toolbox further includes a locking mechanism for securing the two doors together, to the top panel and to a base of the vertically disposed frame.

In some embodiments of the securable vertical toolbox, the securable vertical toolbox further includes one or more handles configured to extend from the side portion of the vertically disposed frame when the two doors are secured.

In some embodiments of the securable vertical toolbox, the securable vertical toolbox further includes one or more RFID readers configured to detect RFID tags attached to tools when the tools are placed within or upon the tool supporting fixtures, thereby providing visible and electronic registration of tool location.

In some embodiments of the securable vertical toolbox, the securable vertical toolbox further includes a camera configured to record activity when the two doors are unsecured.

In some embodiments of the securable vertical toolbox, the tool supporting fixtures include an adjustable powered driver holder. In embodiments, the adjustable powered driver holder includes: a bin; and a plurality of repositionable support plates configured to be selectively fixed within the bin so that any two of the repositionable support plates can be disposed a selected distance from one another within the bin in order to receive a powered driver therebetween.

In some embodiments of the securable vertical toolbox, the tool supporting fixtures include an upright screwdriver holder. In embodiments, the upright screwdriver holder includes: an upper support member configured to be suspended from the peg board, the upper support member including at least one opening configured to receive a distal end of a screwdriver; and a lower support member configured to be suspending from the peg board, the lower support member having a cradle configured to support a proximal end of the screwdriver.

In some embodiments of the securable vertical toolbox, the tool supporting fixtures include a multi-position shaft-type hand tool holder. In embodiments, the shaft-type hand tool holder includes: a support frame configured to be suspended from the peg board, the support frame including one or more slots along a bottom of the support frame; and a plurality of tool support blocks configured to be fastened to the support frame by fasteners extended through the one or more slots along the bottom of the support frame, each of the tool support blocks including a cavity configured to receive a distal end of a shaft-type hand tool.

In some embodiments of the securable vertical toolbox, the tool supporting fixtures include an angled box-end wrench holder. In embodiments, the angled box-end wrench holder includes: a mounting plate configured to be suspended from the peg board; and a wrench support plate extending from the mounting plate at an angle, the wrench support plate including a plurality of hooks for hanging box-end wrenches therefrom.

A horizontal tool staging system is also disclosed, which includes any toolbox or tool staging device having a vertically disposed peg board and one or more tool supporting fixtures configured to be suspended from the peg board, wherein the one or more tool supporting fixtures include the adjustable powered driver holder, upright screwdriver holder, multi-position shaft-type hand tool holder, and/or angled box-end wrench holder described herein.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 5 is a top view of the vertical toolbox, in accordance with one or more embodiments of this disclosure.

FIG. 6 is a top view of the vertical toolbox with first and second tool support panels in their extended tool presentation positions, in accordance with one or more embodiments of this disclosure.

FIG. 27 is an exploded perspective view of a lower support member of the upright screwdriver holder, in accordance with one or more embodiments of this disclosure.

FIG. 32A is a top view of an upper support member of the upright screwdriver holder, wherein the upper support member is configured to support a single screwdriver, in accordance with one or more embodiments of this disclosure.

FIG. 32B is a perspective view of the upper support member illustrated in FIG. 32A, in accordance with one or more embodiments of this disclosure.

FIG. 32C is a front view of the upper support member illustrated in FIG. 32A, in accordance with one or more embodiments of this disclosure.

FIG. 32D is a side view of the upper support member illustrated in FIG. 32A, in accordance with one or more embodiments of this disclosure.

DETAILED DESCRIPTION

Embodiments are described more fully below with reference to the accompanying figures, which form a part hereof and show, by way of illustration, specific example embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
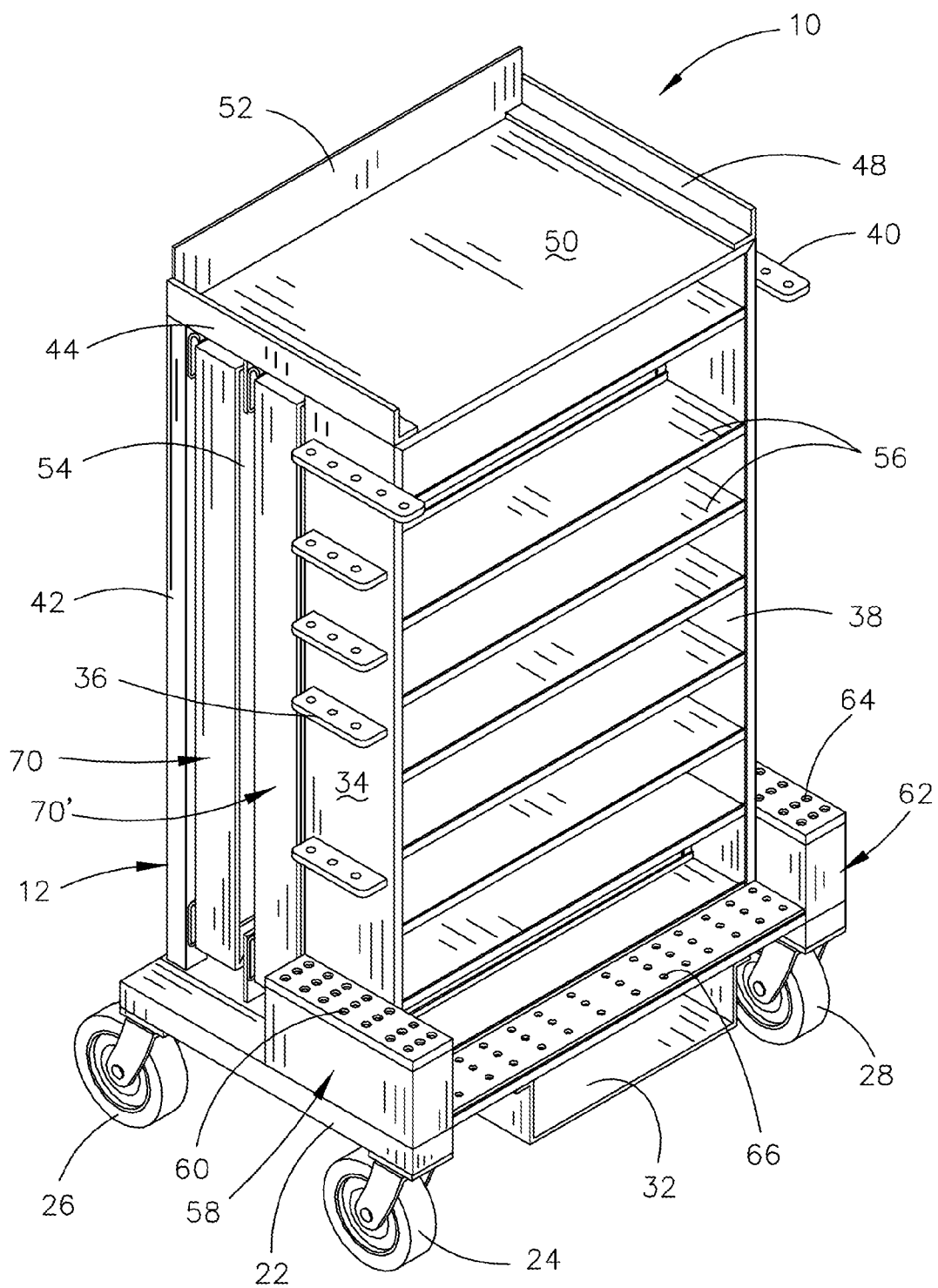
FIG. 1 is a left front perspective view of a vertical toolbox, in accordance with one or more embodiments of this disclosure.

Referring now to FIGS. 1 through 12, a horizontal tool staging system is disclosed. In embodiments, the horizontal staging system may be implemented by a vertical toolbox 10. The toolbox 10 includes a vertically disposed frame 12 having a front side 14, a left side 16, a rear side 18 and a right side 20 (FIGS. 5 and 6). Frame 12 includes a horizontally disposed base 22 supported by caster wheels 24, 26, 28 and 30. A storage bin 32 is secured to the underside of base 22 and has an open front end. Frame 12 includes a vertically disposed left front side frame member 34 which has its lower end secured to base 22. A plurality of vertically spaced tool supports 36 are secured to the outer side of frame member 34 as seen in FIG. 1. Frame 12 also includes a vertically disposed right front side frame member 38 which is secured to base 22. The outer side of frame member 38 has a plurality of tool supports 40 secured thereto.

Figure 2:
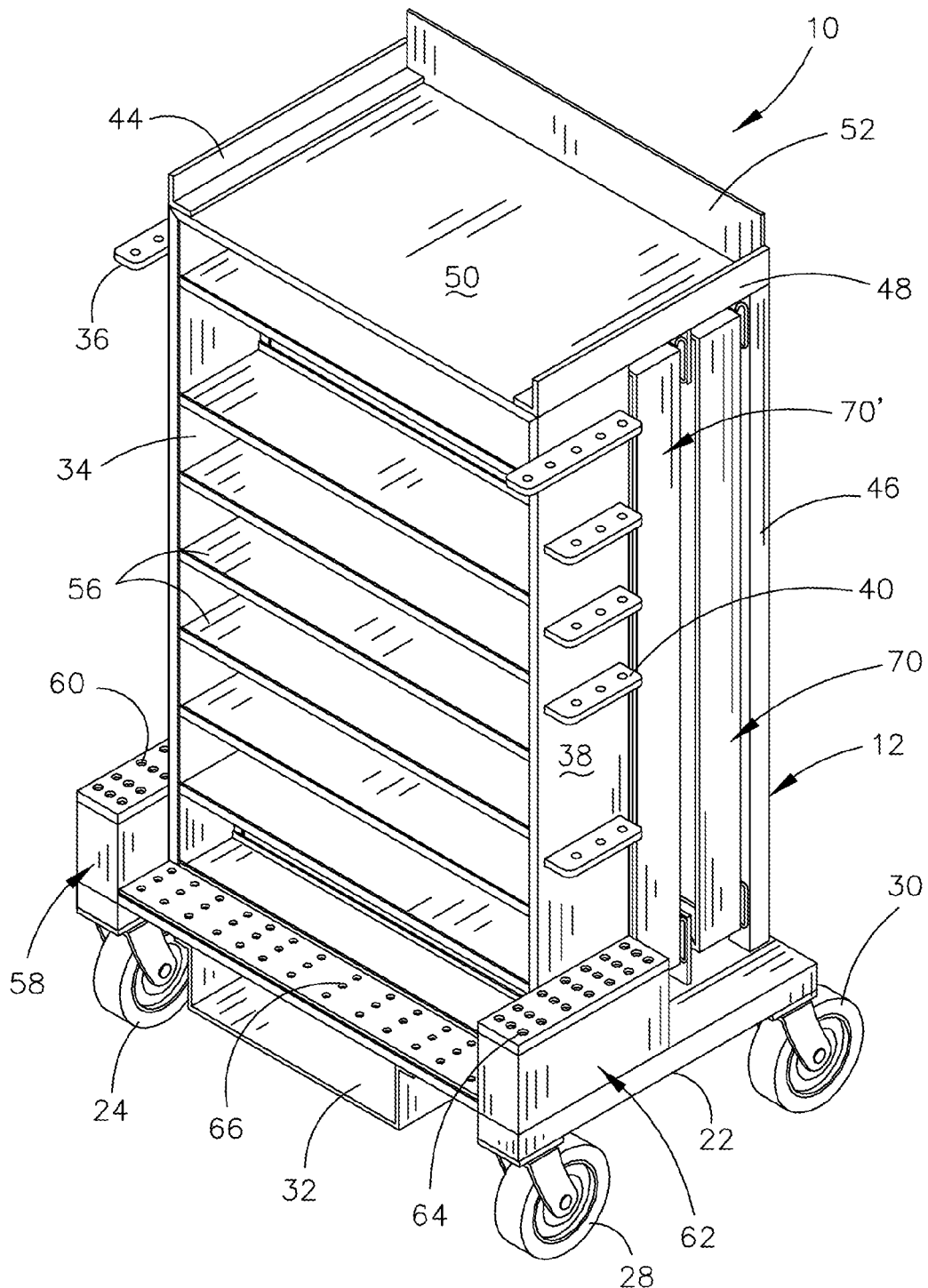
FIG. 2 is a right front perspective view of the vertical toolbox, in accordance with one or more embodiments of this disclosure.
Figure 3:
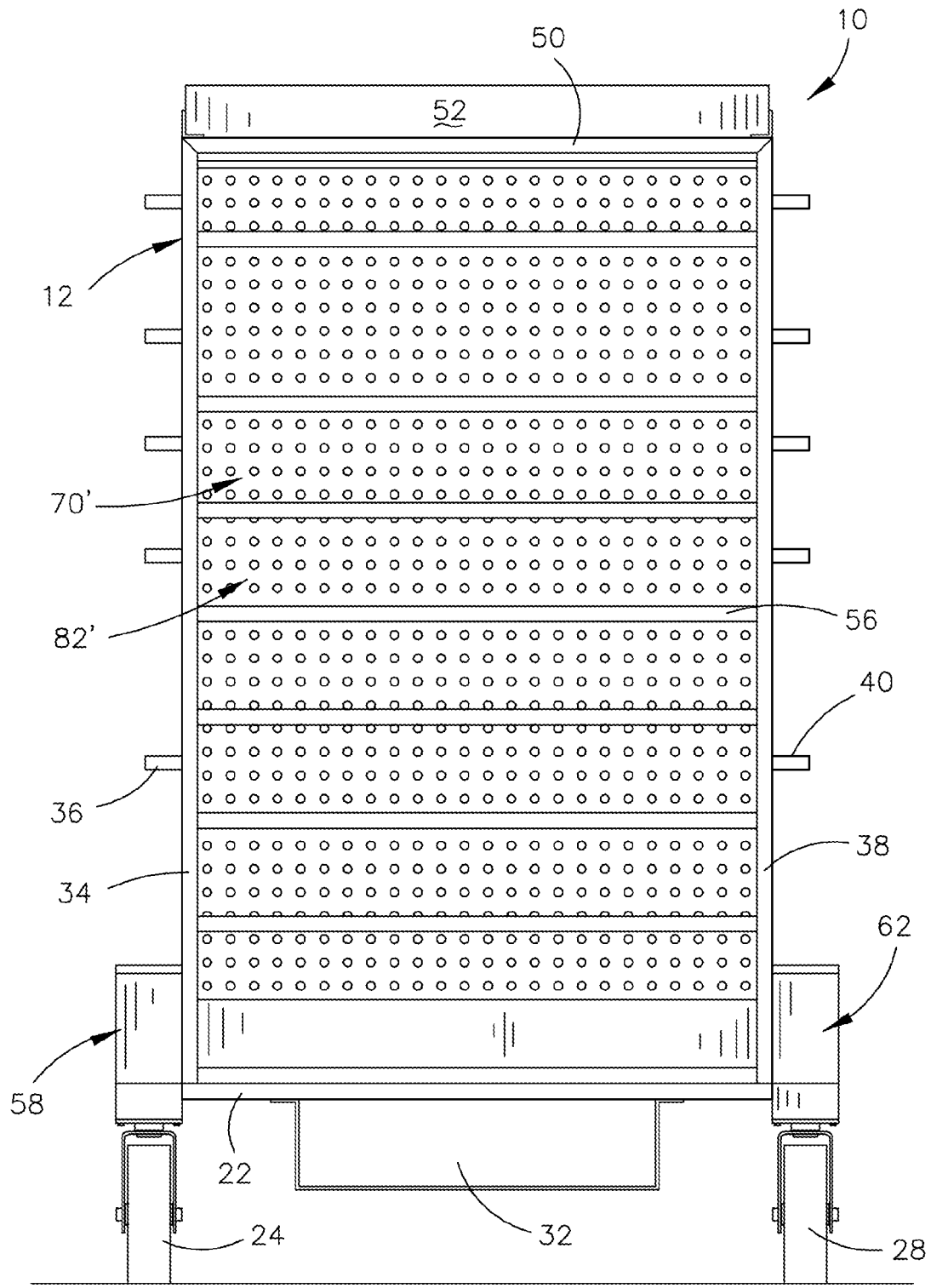
FIG. 3 is a front view of the vertical toolbox, in accordance with one or more embodiments of this disclosure.
Figure 4:
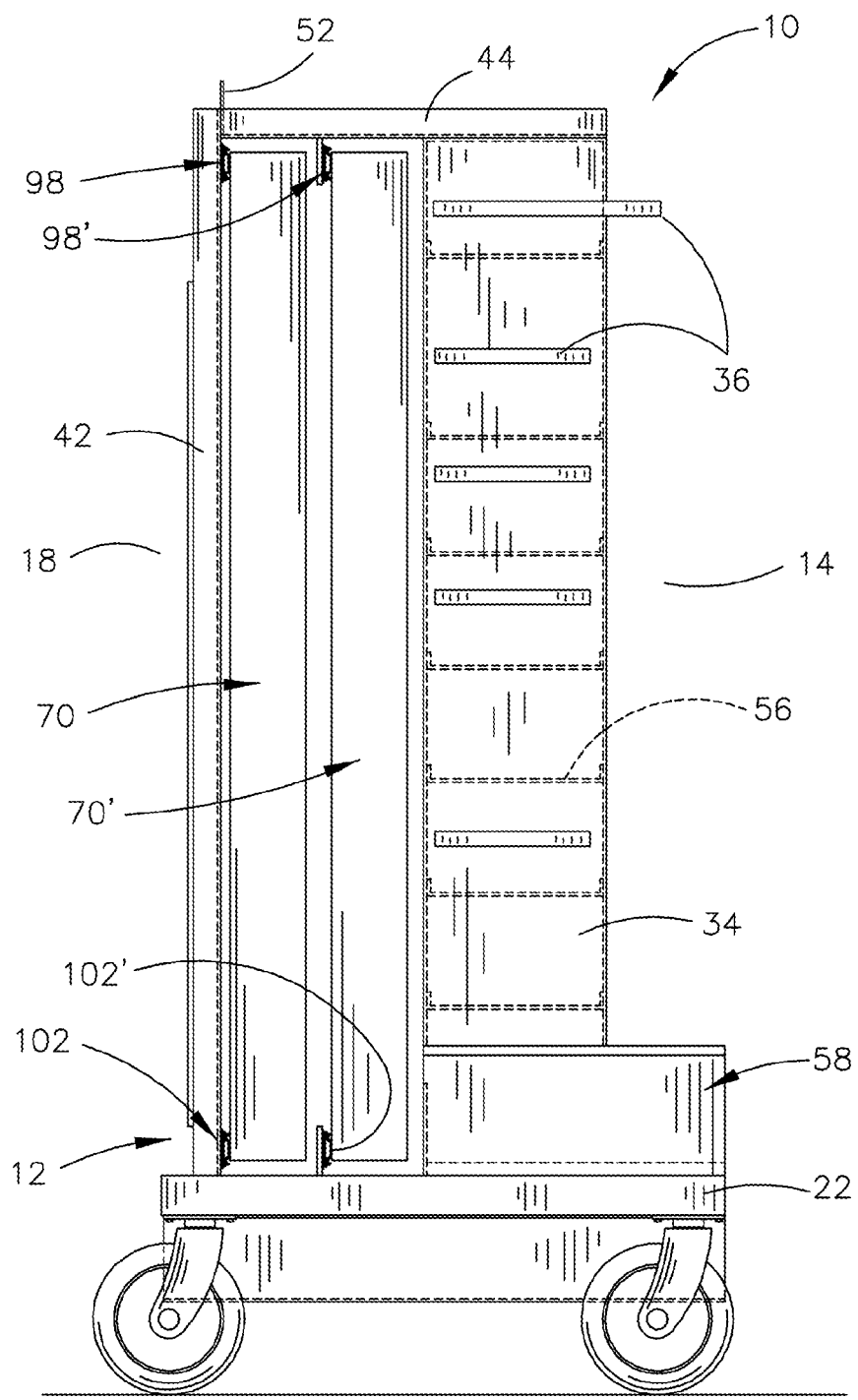
FIG. 4 is a left side view of the vertical toolbox, in accordance with one or more embodiments of this disclosure.
Figure 7:
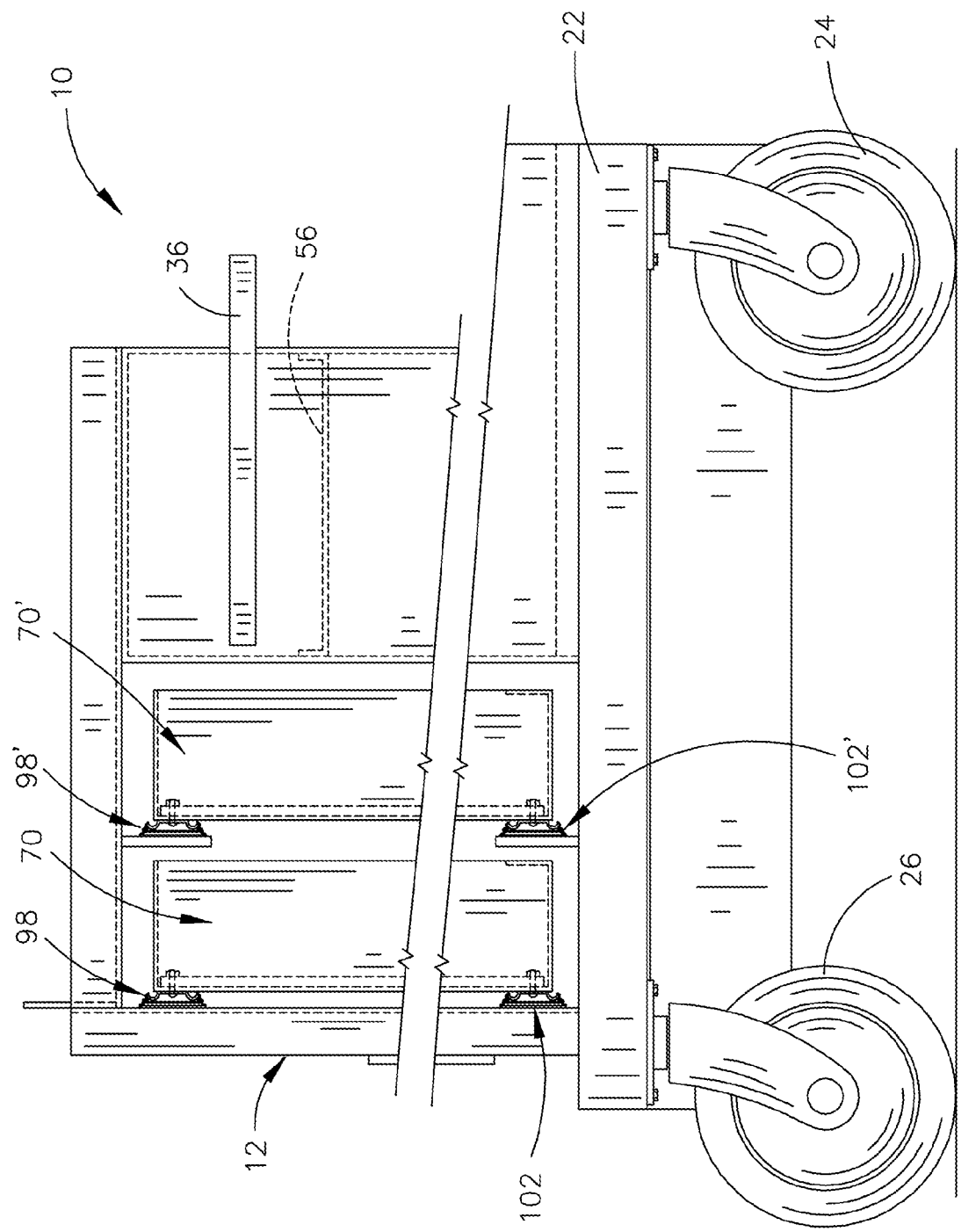
FIG. 7 is a partial side view of the vertical toolbox, in accordance with one or more embodiments of this disclosure.
Figure 8:
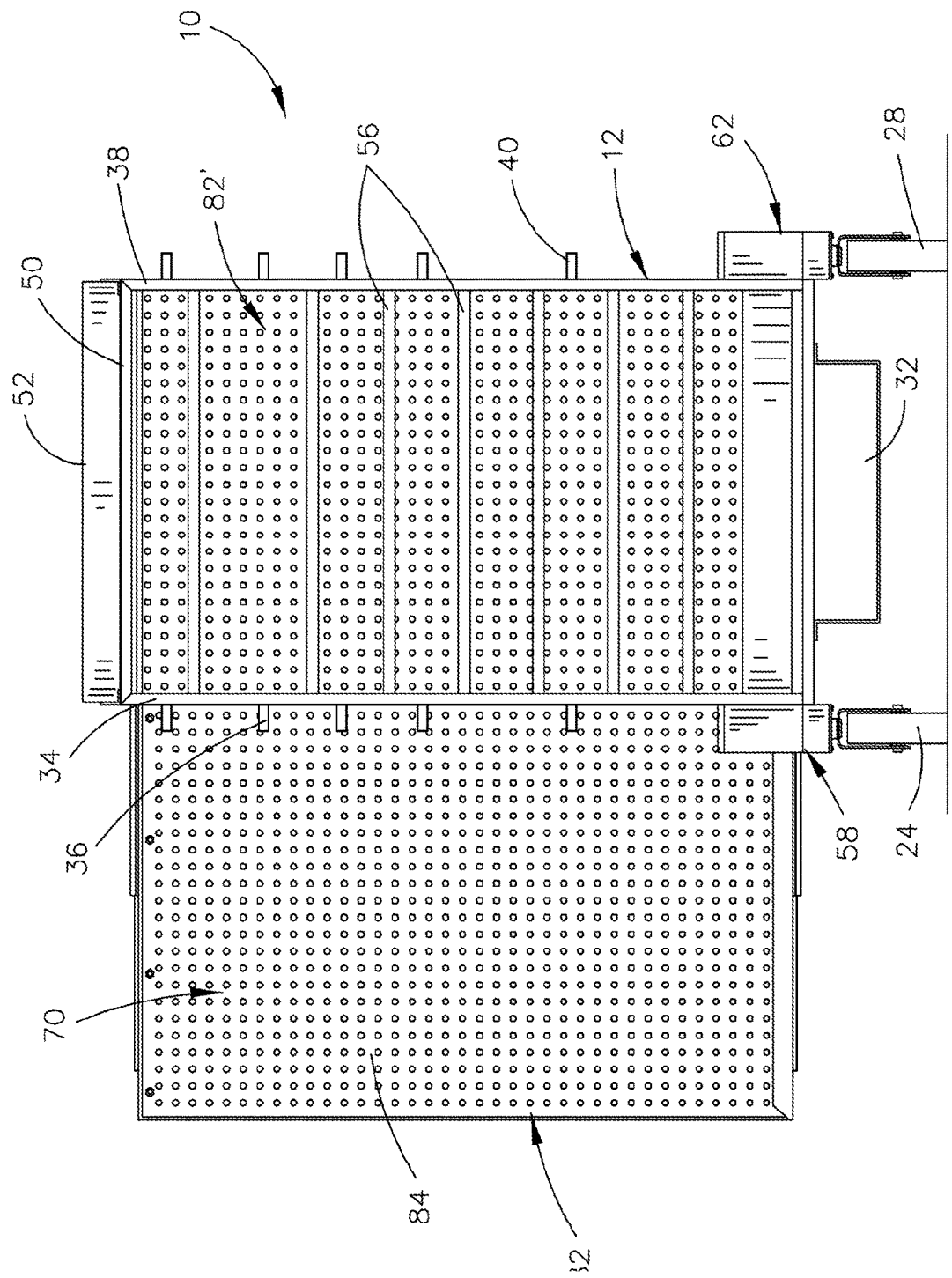
FIG. 8 is a front view of the vertical toolbox with one of the tool support panels being positioned in an extended tool presentation position, in accordance with one or more embodiments of this disclosure.
Figure 9:
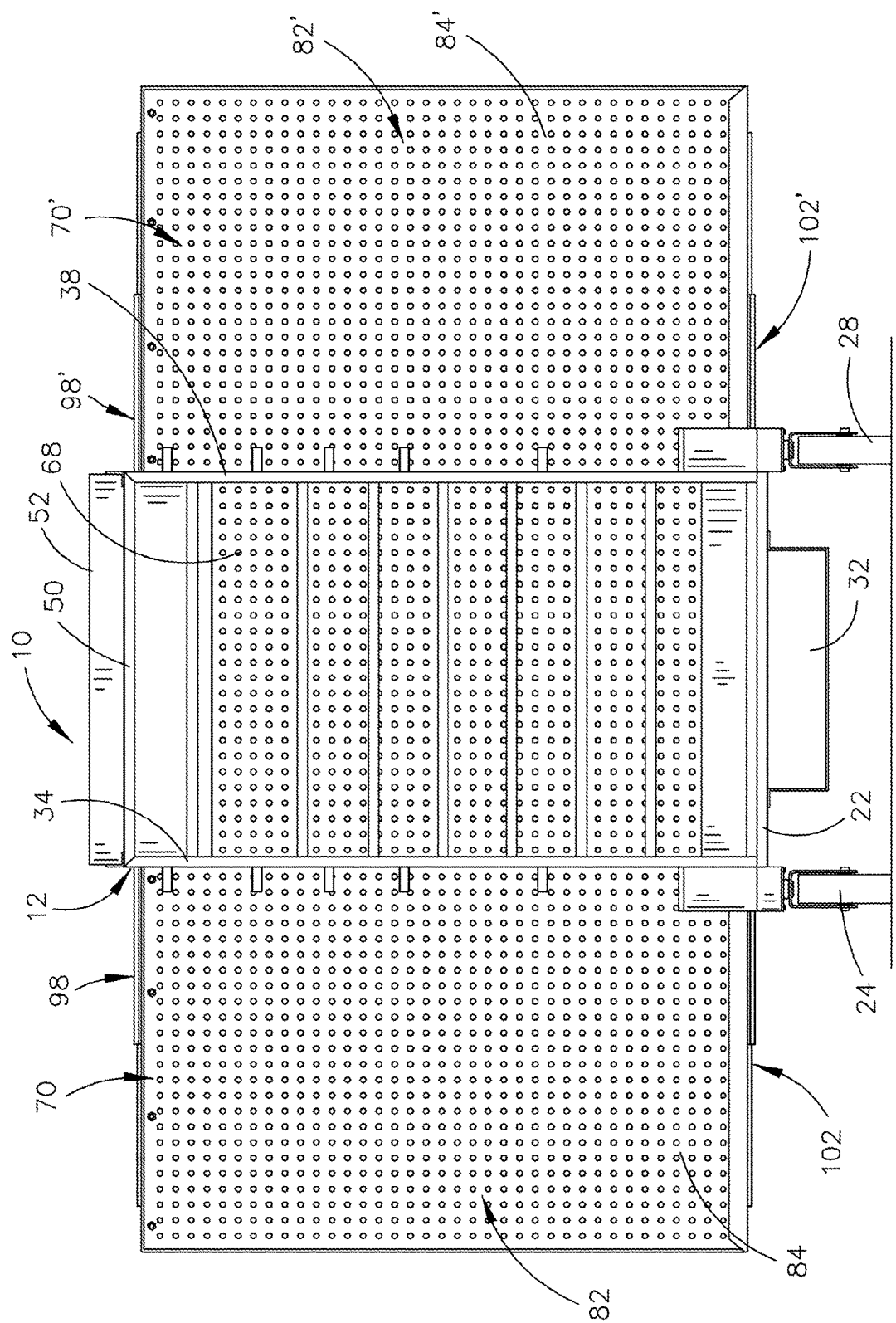
FIG. 9 is a front view of the vertical toolbox with first and second tool support panels in their extended tool presentation positions, in accordance with one or more embodiments of this disclosure.

Frame 12 further includes a vertically disposed left rear frame member 42, the lower end of which is secured to base 22 rearwardly of frame member 34. A horizontally disposed frame member 44 is secured to the upper ends of frame members 34 and 42 and extends therebetween. Frame 12 additionally includes a vertically disposed right rear frame member 46, the lower end of which is secured to base 22. A horizontally disposed frame member 48 is secured to and extends between the upper ends of frame members 38 and 46. As seen in FIGS. 1 and 2, a horizontally disposed top wall 50 extends between frame members 44 and 48. A frame member 52 is secured to and extends between frame members 42 and 46 at the upper ends of frame members 42 and 46. The horizontal spacing of frame members 34, 42 and frame members 38, 46 creates a vertically disposed pocket 54 therebetween which will be described in detail hereinafter.

A plurality of horizontally disposed shelves 56 are secured to frame members 34 and 38 and extend therebetween in a vertically spaced-apart manner, as seen in FIG. 1. An upstanding tool support box 58 having spaced-apart tool receiving openings 60 formed in the upper end thereof is secured to base 22 at the left front portion thereof (FIG. 1). An upstanding tool support box 62 having spaced-apart tool receiving openings 64 formed in the upper end thereof is secured to base 22 at the right front portion thereof (FIG. 1). As seen in FIG. 1, the front portion of base 22 has a plurality of spaced-apart tool receiving openings 66 formed therein.

The numeral 68 refers to a vertically disposed peg board which is secured to frame members 42 and 46 at the rear side thereof for supporting tools thereon. The peg board 68 is also configured to support tool supporting fixtures (i.e., tool holders, hangers and mounting devices, also referred to herein as "tool staging accessories").

A pair of vertically disposed tool supporting drawers or panels 70 and 70' are horizontally slidably mounted on the frame 10 in the pocket 54. Panel 70 is selectively slidably mounted in the frame 12 so as to be movable from a stowed position in the pocket 54 to a tool presentation position horizontally laterally to the left of the frame 10. Panel 70' is selectively slidably mounted in the frame 12 so as to be moveable from a stowed position in the pocket forwardly of panel 70, when panel 70 is in its stowed position, to a tool presentation position horizontally laterally to the right of the frame 10.

Inasmuch as panels 70 and 70' are identical, only panel 70 will be described in detail with "'" designating identical structure on panel 70'. Panel 70 includes a frame 72 having a horizontally disposed upper frame member 74, a left side frame member 76, a lower frame member 78, and a right side frame member 80 which are joined together by welding or the like. A vertically disposed peg board 82 is positioned in the frame 72 and secured thereto with the peg board 82 having a front side 84 and a back side 86. The front side 84 of peg board 82 is configured to support tool hangers 88 and 90 thereon for supporting tools 92 and 94 thereon respectively. The peg board 82 is configured to support a variety of tool supporting fixtures (i.e., tool holders, hangers and mounting devices, also referred to herein as "tool staging accessories"). Frame member 74 is secured to a slide member 96 which is part of a conventional drawer slide assembly 98 which is secured to the upper end of frame 12 in pocket 54. Frame member 78 is secured to a slide member 100 which is a part of a conventional drawer slide assembly 102 which is secured to the lower end of frame 12. The drawer slide assemblies 98 and 102 permit the panel 70 and the tools thereon to be moved from its stowed position to the extension.

In use, tools or other objects may be stored on or in the shelves 56, the tool support boxes 58 and 62, the openings 66, the tool supports 36 and 40, or on top of wall 50. Further, if peg board 68 is utilized, tools may be supported thereon. The weight of the frame means 12 and the tools or objects supported thereon provide a stable support for the panels 70 and 70' when they are in their tool presentation positions of FIGS. 10 and 11. The panels 70 and 70' will have tools supported on the front sides thereof.

When the toolbox 10 is in its stowed position, the panels 70 and 70' are positioned within the pocket 54. The toolbox 10 may be easily wheeled from location to location. When it is desired to use the tools supported on the toolbox 10, the panels 70 and 70' may be moved to their tool presentation positions of FIGS. 10 and 11. The tools on the toolbox 10 and the panels 70 and 70' are readily available to the mechanic or person using the tools.

The toolbox 10 can support an enormous amount of tools, etc. thereon and therein. The toolbox 10 is very stable, even when the panels 70 and 70' are in their tool presentation positions due to the weight of the frame 12 and the tools supported thereon.

Embodiments of the toolbox 10 are further described in U.S. Pat. No. 8,944,444, entitled "VERTICAL TOOL BOX," which is incorporated herein by reference in its entirety.

Referring now to FIGS. 13A through 14B, a securable enclosure 100 for the vertically disposed toolbox 10 is disclosed. The enclosure 100 for the toolbox 10 is configured to secure tools from theft or from falling out of the toolbox 10 during transportation. In embodiments, the enclosure 100 secures the toolbox 10 from all sides, including the top, rear, front, left and right sides of the toolbox 10. As shown in FIG. 13B, the enclosure 100 includes a rear panel 106, a top panel 102, and two doors 104, 104'. The doors 104, 104' are configured to surround the vertically disposed frame 12 of the toolbox 10 when the support panels 70, 70' are retracted into the frame 12 and the doors 104, 104' are secured (i.e., closed). In some embodiments, each panel 70, 70' is configured to slide in either direction. In embodiments, each of the doors 104, 104' includes a first panel and a second panel, which may be perpendicular to one another (e.g., joined at a 90 degree angle) or substantially so (e.g., joined at an angle in the range of 80 to 100 degrees, or the like). Alternatively, the first and second panels may be joined by a hinge. As shown in FIG. 14A, the first panel is configured to cover a side portion (e.g., left or right side) of the frame 12 when the door 104/104' is closed, and the second panel is configured to cover a front portion (e.g., left front portion or right front portion) of the frame 12 when the door 104/104' is closed.

When the doors 104, 104' are unsecured and opened up, the frame 12 toolbox 10 is exposed on three sides, meaning open tool exposure in front, on the left side and on the right side, all while maintaining balance of the entire system. To maintain balance, without interference to the operator use, the enclosure 100 may be designed as follows. A single metal sheet of a thick gauge (e.g., 10 gauge or higher) may be used to support each door panel to retain shape of the panel and prevent the panel from sagging down in front which would make the doors 104, 104' difficult to close when meeting in the front center. The weight distribution with this panel form also helps maintain center of gravity balance when the doors 104, 104' are open. Folding the panel back around unit causes imbalance when few tools are stored or staged in the toolbox 10. Keeping weight more forward by having two-panel door structures helps balance the toolbox 10 when the doors 104, 104' are open.

Figure 14A:
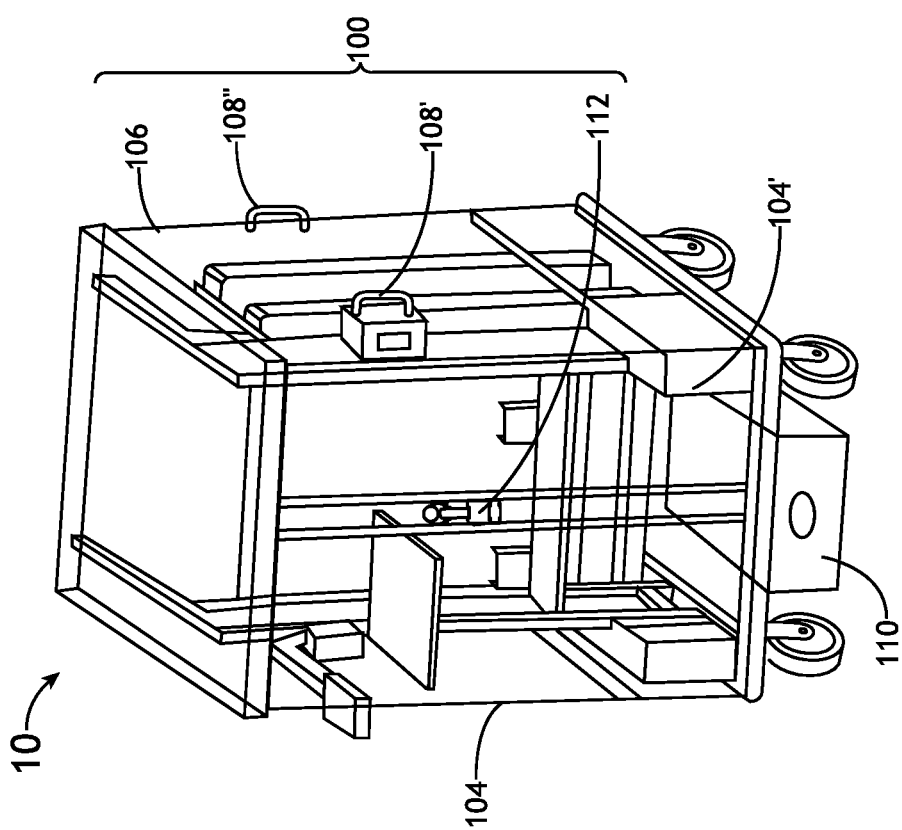
FIG. 14A is a perspective view of the vertical toolbox with an enclosure in a closed position, in accordance with one or more embodiments of this disclosure.
Figure 14B:
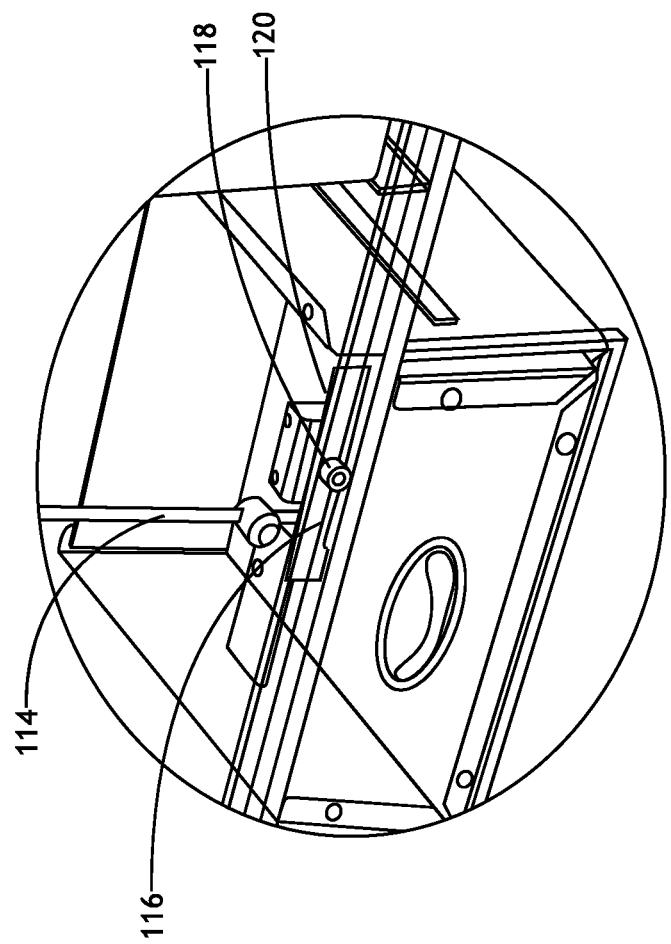
FIG. 14B is zoomed in portion of the perspective view shown in FIG. 14A, in accordance with one or more embodiments of this disclosure.

In embodiments, the toolbox 10/enclosure 100 includes one or more handles 108, 108' configured to extend from the side portion (e.g., right side and/or left side) of the vertically disposed frame 12 when the doors 104, 104' are secured. For example, as shown in FIG. 14A, handles 108', 108" may be coupled to the frame 12 and configured to extend through an opening in door 104' when the door 104' is closed. The handles 108, 108' allow easy maneuvering of the system from either left or right side with either a pushing or pulling force when the enclosure 100 is closed. Use of heavy gauge steel for the door panels 104, 104' provides heightened security for the enclosure function but may affect ease of maneuverability. Industrial handles 108 and 108' that are anchored to the frame 12 can make is easier to maneuver the toolbox 10, given the overall weight of the system. In some embodiments, the door panels 104, 104' are also reinforced with hat channels to maintain panel flat surface and add support to keep panel level from front to back to help reduce panel sagging.

An object of the vertical toolbox 10 is to increase operator efficiency. In this regard, the enclosure 100 needs to be time efficient to operate or setup the toolbox 10 so as not to counteract the time savings gained from using the vertical toolbox 10. The enclosure 100 should also maintain system balance and withstand thousands of cycles. In some embodiments, for security requirements, the enclosure 100 includes a stationary back panel (rear panel 106) with one each hinged left door 104' and one hinged right door 104, a four-point locking mechanism (FIG. 14B) and four positioning handles 108, 108', etc. The four-point locking mechanism locks the right frontside panel of door 104' to the top panel 102 and base of the toolbox 10 with cam rods 114 and further locks the right frontside panel of door 104' to the left frontside panel of door 104 with a hook from the locking mechanism that engages over a rod pin on the left frontside panel of door 104 and the fourth point locks in the lower drawer 110 which is mounted below the base of the toolbox 10 by means of the cam rod 114 depressing a lever 116 which engages a stop into the top lip of the lower drawer 110. This is accomplished by the cam rod 114 pushing on the lever 116 which pivots on a captured rod pin 118 supporting a spring 120 used to keep the lever 116 in an unlocked position when the vertical toolbox 10 is in use. Using only one handle 112 with the four-point locking mechanism to secure entire system maintains a key purpose of the vertical toolbox 10, which is to provide efficient use of time for the operator both in the use of hand tools and in setting up or closing the toolbox 10.

The enclosure 100 of the vertical toolbox 10 with lower drawer design lock allows for higher levels of security with fully enclosed surfaces, four-point locking mechanism and optionally, a security camera 212 (FIG. 15) mounted within the toolbox 10. In some embodiments, the toolbox 10 itself can also be tracked with a GPS tracking device if desired. Since the toolbox 10 is an open concept for tool access once open, it allows for the camera 212 to be mounted in a position to record or sense individuals with either a motion sensor or mechanical means (e.g., electromechanical, magnetic or optical switch) for activating the camera 212 when the toolbox enclosure 100 is opened. The camera 212 may be mounted to face away from the tools and towards the opening area on the front of the toolbox 10 where the individual opening the enclosure 100 can be seen or visualized. Consequently, the person who opens the toolbox 10 will be recorded on the camera 212. Existing camera technology of any type can be used to visualize and record anyone opening the toolbox 10. The toolbox 10 may also be equipped with battery back up to ensure recording capabilities at all times. In some embodiments, the camera 212 may be equipped with 2-way talking capabilities and/or configured to transmit immediate camera images to a designated device (e.g., server, surveillance computer, mobile device (e.g., smartphone, tablet, notebook computer, wearable smart device), etc.). This allows the owner of the toolbox 10 to interface with anyone approaching the toolbox 10 to access the tools and to detect and/or prevent unauthorized access.

Figure 15:
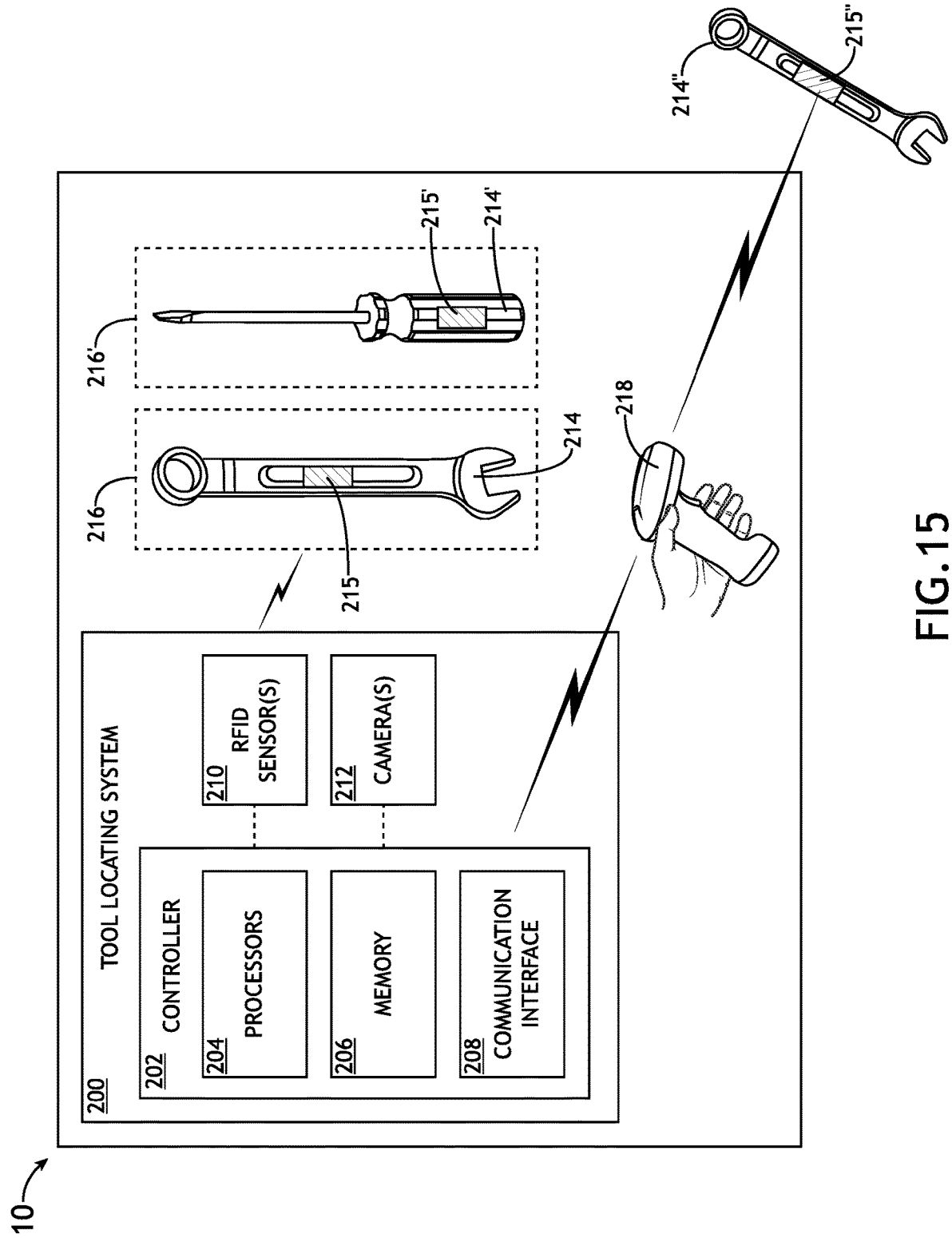
FIG. 15 is a block diagram illustrating a tool locating system integrated within the vertical toolbox, in accordance with one or more embodiments of this disclosure.
Figure 16:
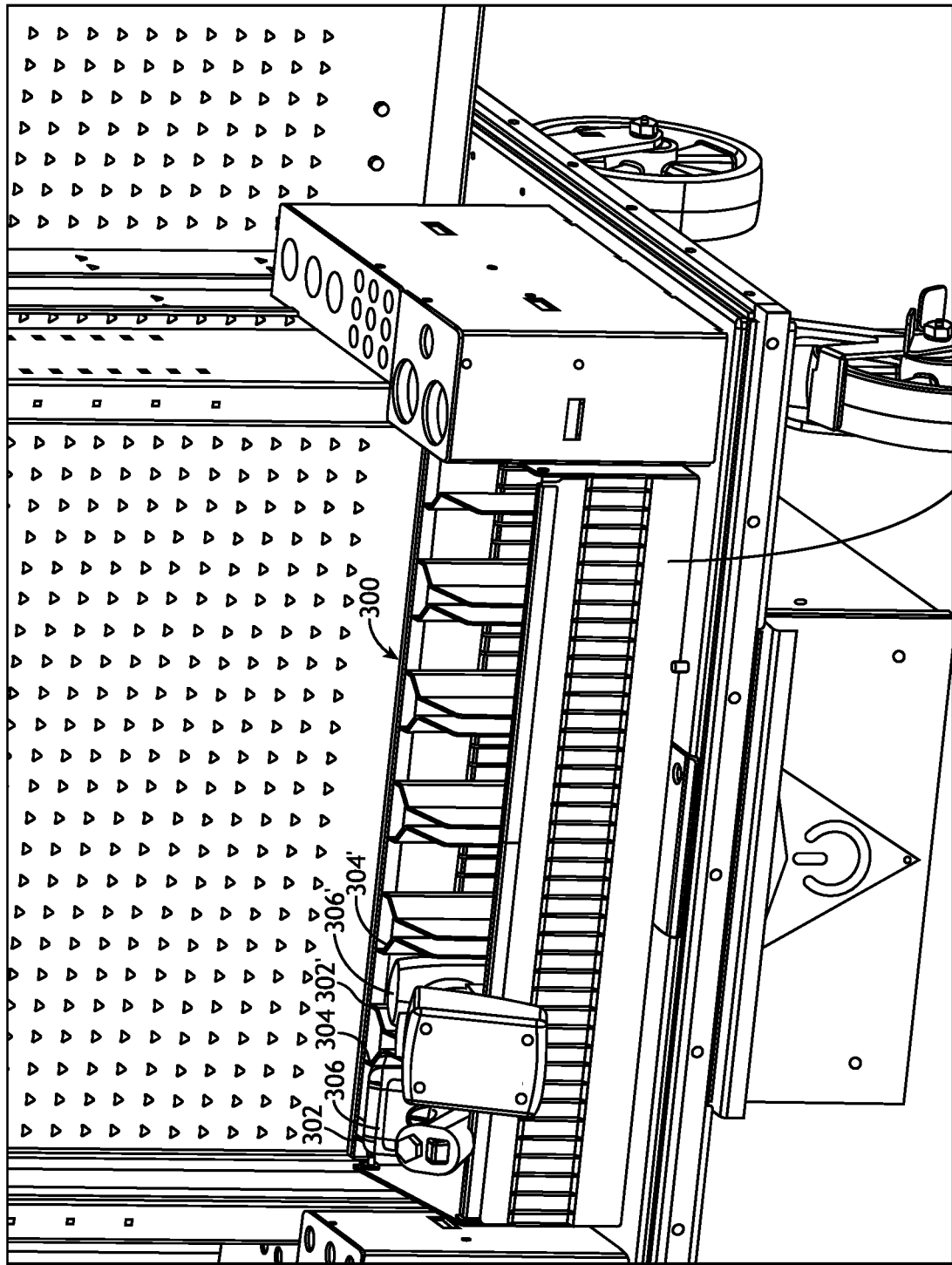
FIG. 16 is a perspective view of an adjustable powered driver holder coupled to a peg board of the vertical toolbox, in accordance with one or more embodiments of this disclosure.
Figure 17:
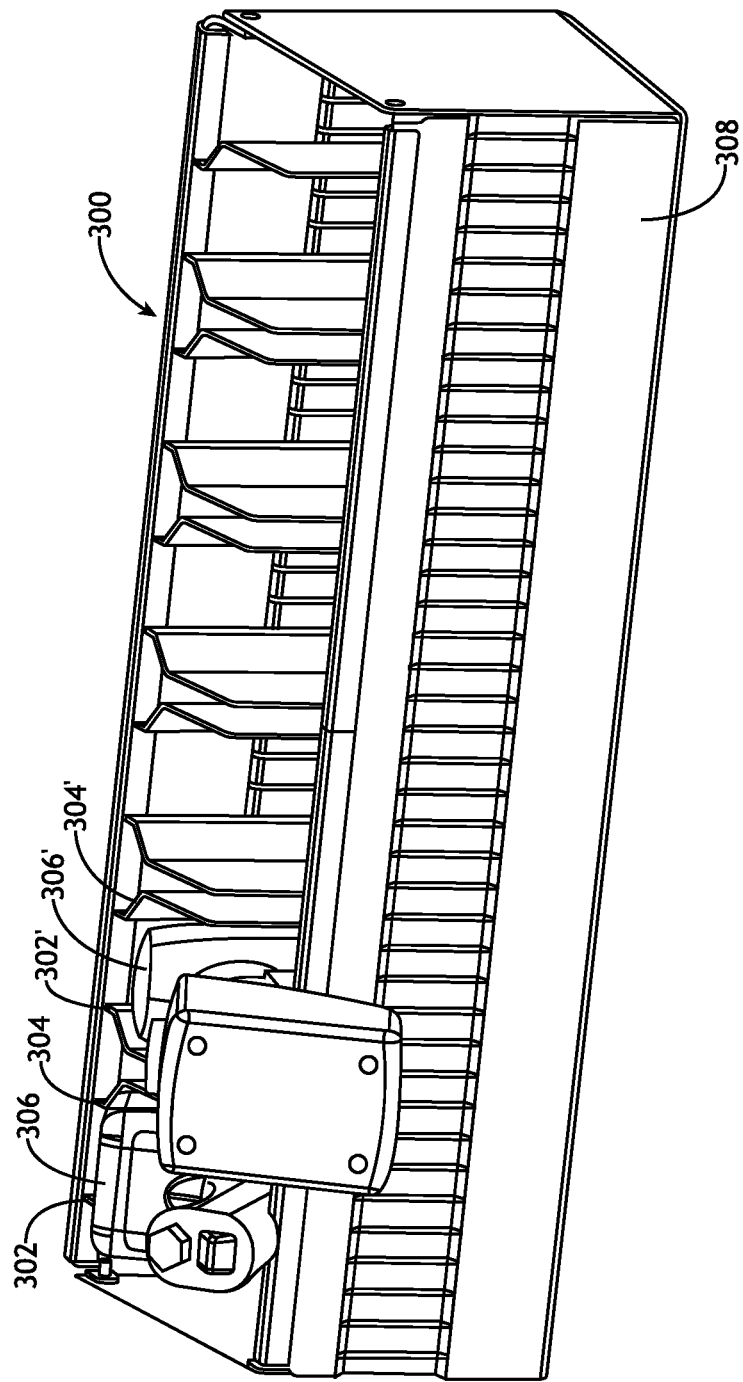
FIG. 17 is a perspective view of the adjustable powered driver holder, in accordance with one or more embodiments of this disclosure.

FIG. 15 illustrates various electronic components that may be incorporated within the toolbox 10, including, but not limited to, a tool locating system 200. In embodiments, the tool locating system 200 includes one or more RFID sensors 210 (e.g., RFID transceivers or readers) configured to sense when RFID tagged tools 214, 214' (having RFID tags 215, 215') are in their desired locations 216, 216'. For example, the RFID sensors may be configured to detect RFID tags 215, 215' attached to tools 214, 214' when the tools 214, 214' are placed within or upon tool supporting fixtures, thereby providing visible and electronic registration/accounting of tool location.

The use of RFID technology within the vertical toolbox 10 adds another level of security to common RFID tracking systems. Electronics are not infallible, nor are human visual tool tracking means. The combination of RFID to sense tool presence/absence and open visual human tool inventory capabilities of the toolbox 10 (i.e., horizontal tool staging capability) itself helps to provide two rapid tool inventory accounting capabilities to serve as backup tool inventory control to each means of tracking.

Tool inventory control is paramount to hazards that can be caused by missing tools being left in the mechanical devices they are used to fix. In some embodiments, the additional tool inventory control offered by RFID in combination with the vertical toolbox 10 (horizontal tool staging system) involves the use of one or more handheld RFID readers 218. The ability of a handheld RFID reader 218 to operate off of 12V power allows the vertical toolbox 10 to be used as a power source for the handheld RFID reader 218 to help locate an RFID tagged tool 214" (having RFID tag 215") if lost in a work site. In some embodiments, the handheld RFID reader 218 is wirelessly connected to a main controller 202 of the tool locating system 200. Alternatively, the RFID reader 218 may be physically connected (e.g., wired) to the controller 202 and may have both a remote battery backup unit on the vertical toolbox to keep power to the handheld RFID reader 218 and the ease of movement of the vertical toolbox 10 to maneuver the handheld RFID reader 218 around a work site. The toolbox 10 may use large 8" wheels which make the system easily moved and possible to move with one hand by operator over a great distance. This allows for both scanning with the handheld RFID reader 218 and moving the vertical toolbox 10 to and around the work site. Accordingly, in embodiments, the tool locating system 200 allows for tool inventory tracking both on/within the vertical toolbox 10 and remotely to any location where a tool (e.g., tool 214") might have been lost, thereby saving countless man hours often used to find a lost tool in critical repair sites (e.g., airplane, military tank, etc.).

The tool locating system 200 includes a controller 202 configured to interface with and control the RFID sensor(s) 210, camera(s) 212, and/or handheld RFID reader(s) 218. As shown in FIG. 15, the controller 202 may include, but is not limited to, at least one processor 204, memory 206, and communication interface 208.

The processor 204 provides processing functionality for at least the controller 202 and can include any number of microprocessors, microcontrollers, circuitry, field programmable gate array (FPGA) or other processing systems, and resident or external memory for storing data, executable code, and other information accessed or generated by the controller 202. The processor 204 can execute one or more software programs embodied in a non-transitory computer readable medium (e.g., memory 206) that implement techniques/operations described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 may include a tangible, computer-readable storage medium that provides storage functionality to store various data and/or program code associated with operation of the controller 202 and/or the processor 204, such as software programs and/or code segments, or other data to instruct the processor 204, and possibly other components of the controller 202, to perform the functionality described herein. Thus, the memory 206 can store data, such as a program of instructions for operating the controller 202, including its components (e.g., processor 204, communication interface 208, etc.). It should be noted that while a single memory is described, a wide variety of types and combinations of memory (e.g., tangible, non-transitory memory) can be employed. The memory 206 can be integral with the processor, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 208 may be operatively configured to communicate with components of the controller 202/tool locating system 200. For example, the communication interface 208 can be configured to retrieve data from the processor 204 or other devices, transmit data for storage in the memory 206, retrieve data from storage in the memory 206, and so forth. The communication interface 208 can also be communicatively coupled with the processor 204 to facilitate data transfer between components of the controller 202 and the processor 204. It should be noted that while the communication interface 208 is described as a component of the controller 202, one or more components of the communication interface 208 can be implemented as external components communicatively coupled to the controller 202 via a physical and/or wireless connection.

It shall be understood that the operations performed by the tool locating system 200 are not necessarily all performed by one controller 202. In some embodiments, the operations may be performed by one or more controllers. For example, one or more operations and/or sub-operations may be performed by a first controller, additional operations and/or sub-operations may be performed by a second controller, and so forth. Furthermore, some of the operations and/or sub-operations may be performed in parallel and not necessarily in the order that they are disclosed herein.

The software used to track the RFID tool inventory can be expanded or tied into additional programmable software and hardware to add the capabilities to sense whether an operator has security access clearance to the tools being removed from the vertical toolbox 10 by means of existing RFID chip on the operator or other electronic identifiers for the operator. The controller 202 can also be configured to send a warning signal if the tools are being removed from the vertical toolbox 10 electronic perimeter without permission. Any number of common security warning signals can be a result of tools being taken outside of the electronic perimeter. The main purpose of this tool inventory software and hardware configuration is to allow seamless use of tools by the approved operator without requiring time consuming manual interface with inventory tracking control panels where the operator needs to indicate the removal of tools from a standard tool storage box and/or their personal access information.

The vertical toolbox 10, in combination with security devices and RFID, is capable of any number of signaling patterns for the operator to choose from to perform numerous tasks, for example, motion sensors can be added at one or more locations to signal the software when the vertical toolbox 10 is in motion (or a proximity switch to signal when toolbox 10 is moved over a certain predetermined distance, or other motion sensing devices). The software (executed by controller 202) can also be configured to perform an automatic tool inventory and alert the operator if a tool is missing (e.g., not detected within the toolbox perimeter).

The combination of the rapid use enclosure 100 for tool security protection when not in use by operator with wireless video/audio camera systems and advanced RFID inventory control and tool tracking capabilities (tool locating system 200) provide a high level security for keeping tool inventory safe, easy to access for use, options for missing tool tracking and minimal electronic interface time for high level RFID inventory control tracking to give operators the highest level of security with simple and quick tool inventory tracking and security control. Furthermore, both the physical and electronic control options serve as back up security to each other if one fails to detect tool removal. This type of tool inventory tracking redundancy offers improved tracking capabilities over existing systems.

The vertical toolbox 10 or any other horizontal tool staging system may employ a number of tool supporting fixtures (sometimes referred to herein as "tool staging accessories") to hold tools against a peg board (e.g., peg board 68/82) so that they are conveniently displayed and accessed. Various tool staging accessories are described below with reference to FIGS. 16 through 44D.

Figure 10:
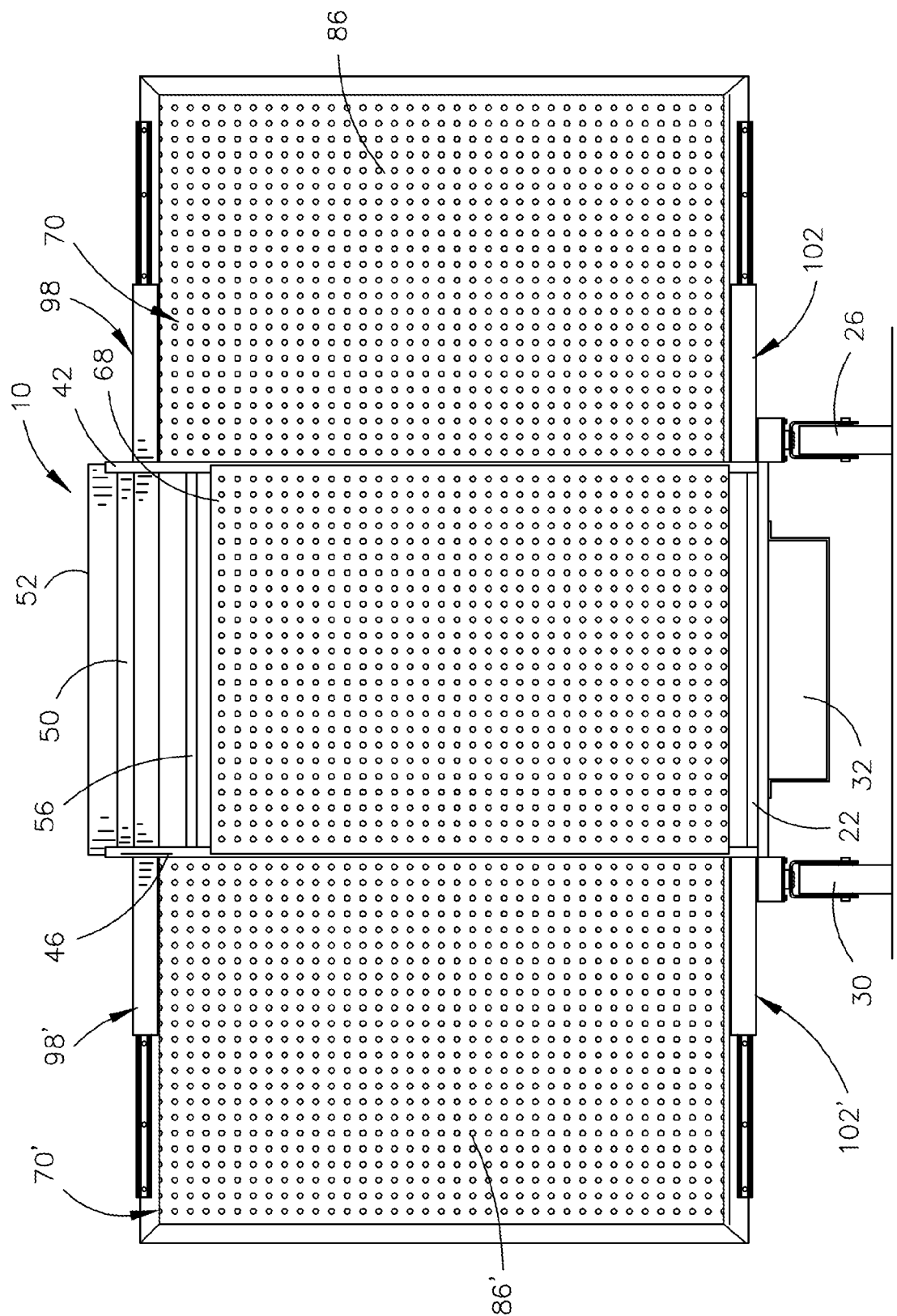
FIG. 10 is a rear view of the vertical toolbox with first and second tool support panels in their extended tool presentation positions, in accordance with one or more embodiments of this disclosure.
Figure 11:
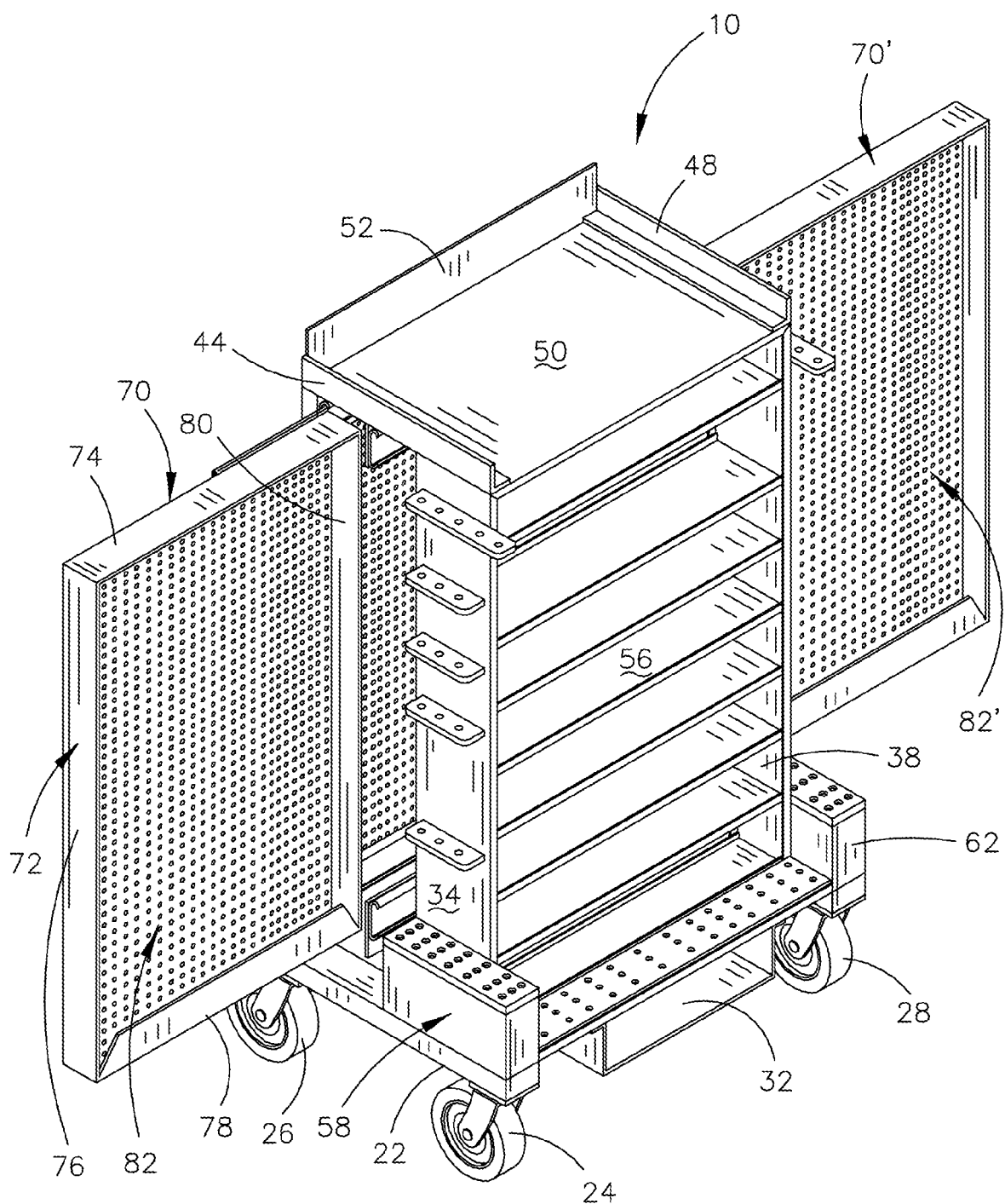
FIG. 11 is a perspective view of the vertical toolbox with first and second tool support panels in their extended tool presentation positions, in accordance with one or more embodiments of this disclosure.
Figure 12:
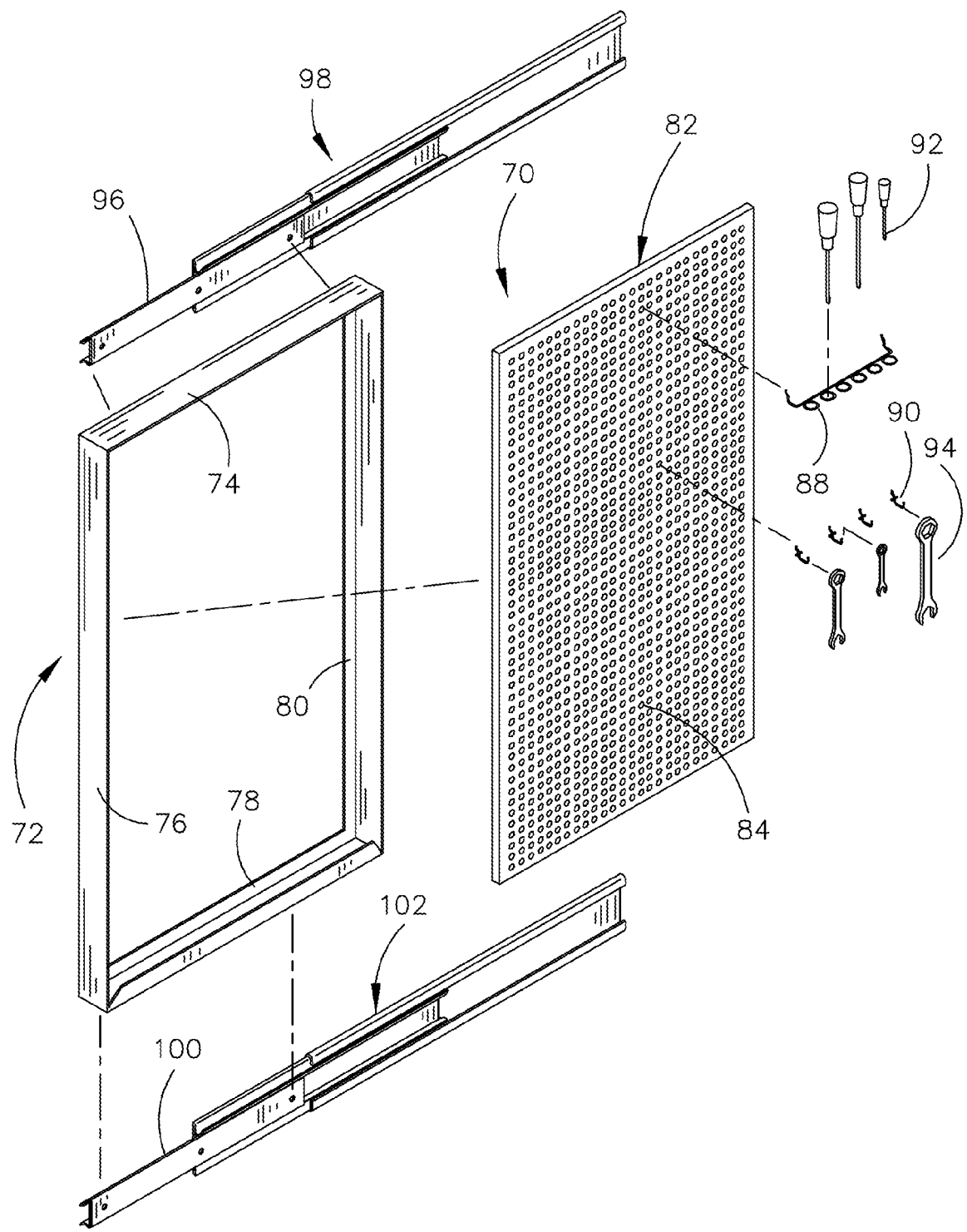
FIG. 12 is an exploded perspective view of one tool support panel of the vertical toolbox, in accordance with one or more embodiments of this disclosure.
Figure 13A:
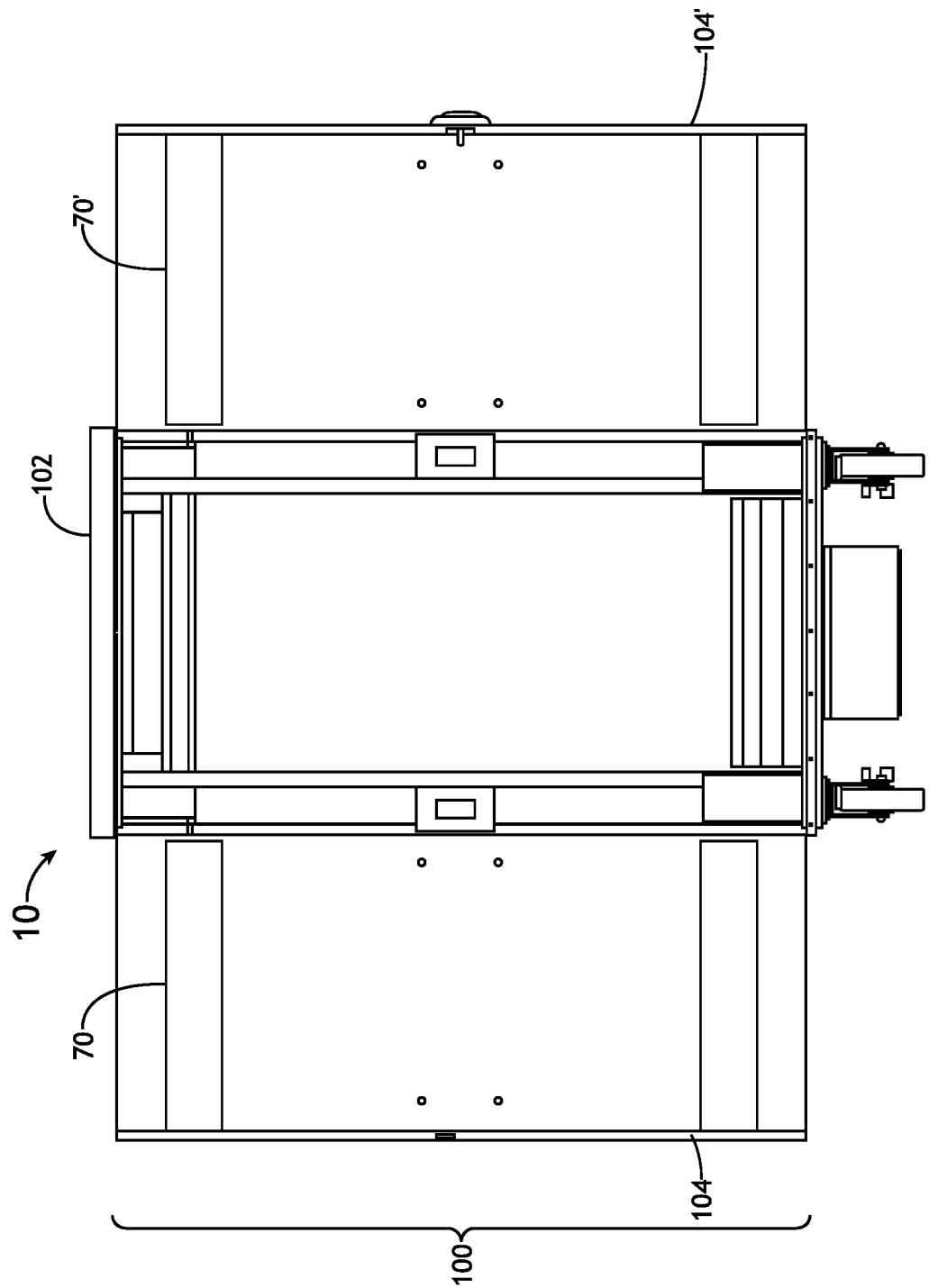
FIG. 13A is a front view of the vertical toolbox with an enclosure in an open position and with first and second tool support panels are in their extended tool presentation positions, in accordance with one or more embodiments of this disclosure.
Figure 13B:
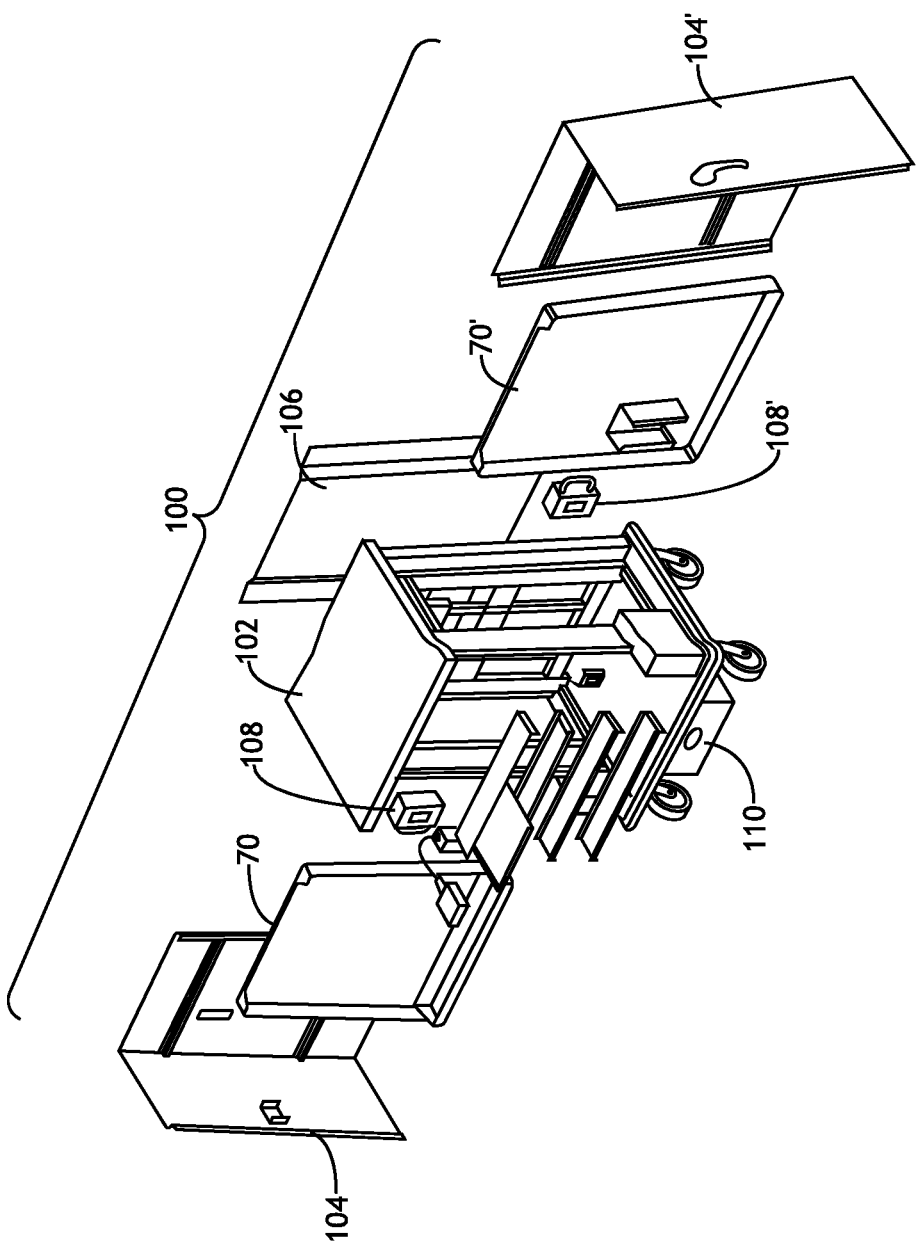
FIG. 13B is an exploded perspective view of the vertical toolbox with an enclosure, in accordance with one or more embodiments of this disclosure.

Referring now to FIGS. 16 through 22D, an adjustable powered driver holder 300 is disclosed. In embodiments, the adjustable powered driver holder 300 includes a bin 308, which may be configured to be suspended from a peg board or any other wall-type surface and/or configured to be disposed upon planar surface or slidably within a compartment. As shown in FIG. 10, the bin 308 includes a plurality of grooves 310 formed along inner sidewalls of the bin 308. The adjustable powered driver holder 300 further includes a plurality of repositionable support plates 302, 304 configured to slide within the grooves 310 so that any two of the repositionable support plates 302, 304 can be disposed a selected distance from one another within the bin 308 in order to receive a powered driver 306 therebetween. The adjustable powered driver holder 300 may accommodate any type/combination of powered drivers 306, including, but not limited to, pneumatic and/or battery driven power drivers, and both inline and pistol gripped power driver styles. These drivers are used for mechanical manipulation through use of sockets, drill bits or screwdriver-type work.

Figure 18:
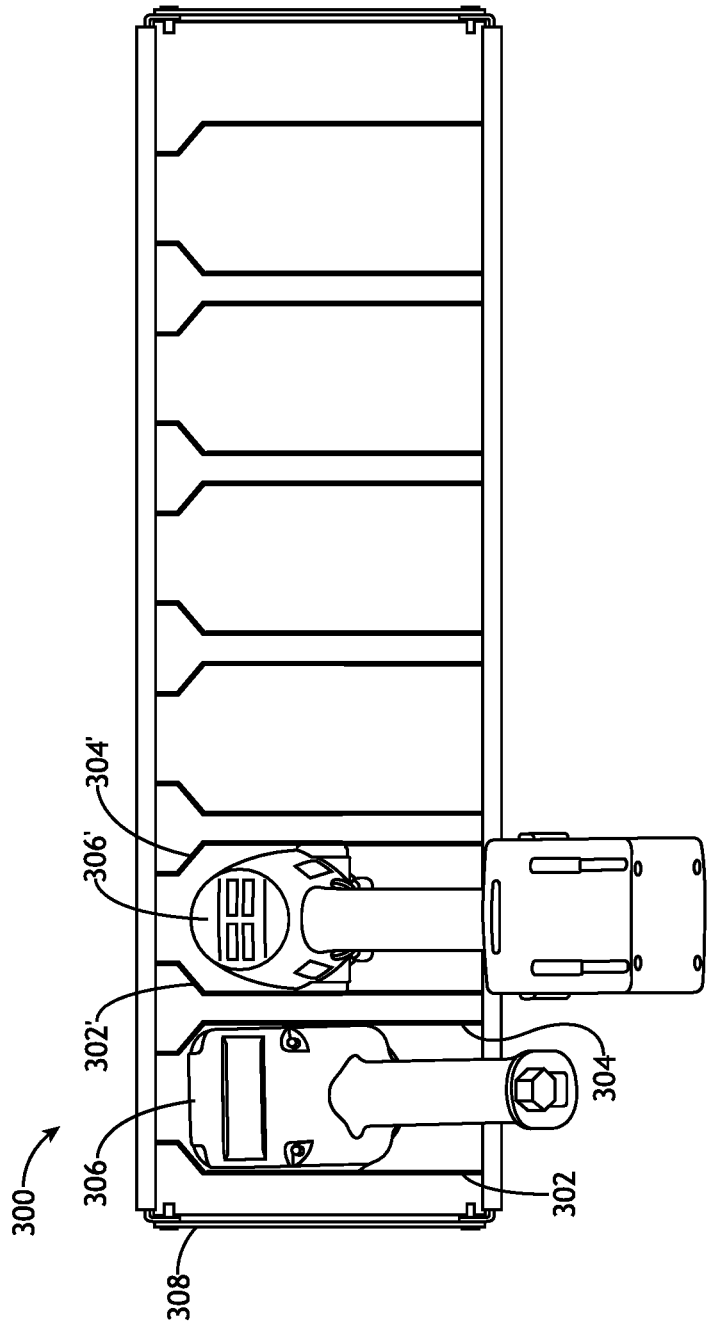
FIG. 18 is a top view of the adjustable powered driver holder, in accordance with one or more embodiments of this disclosure.
Figure 19:
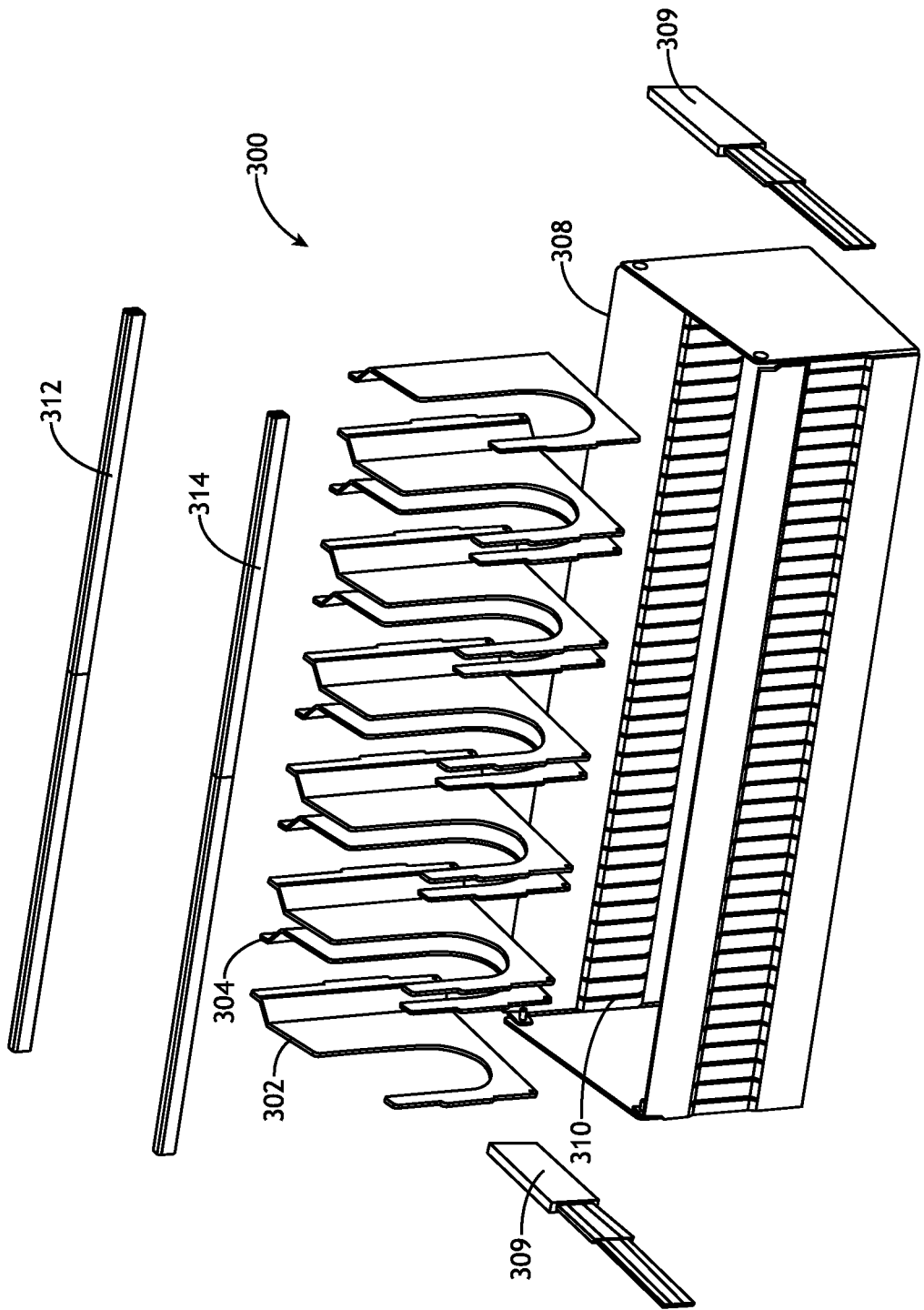
FIG. 19 is an exploded perspective view of the adjustable powered driver holder, in accordance with one or more embodiments of this disclosure.
Figure 20:
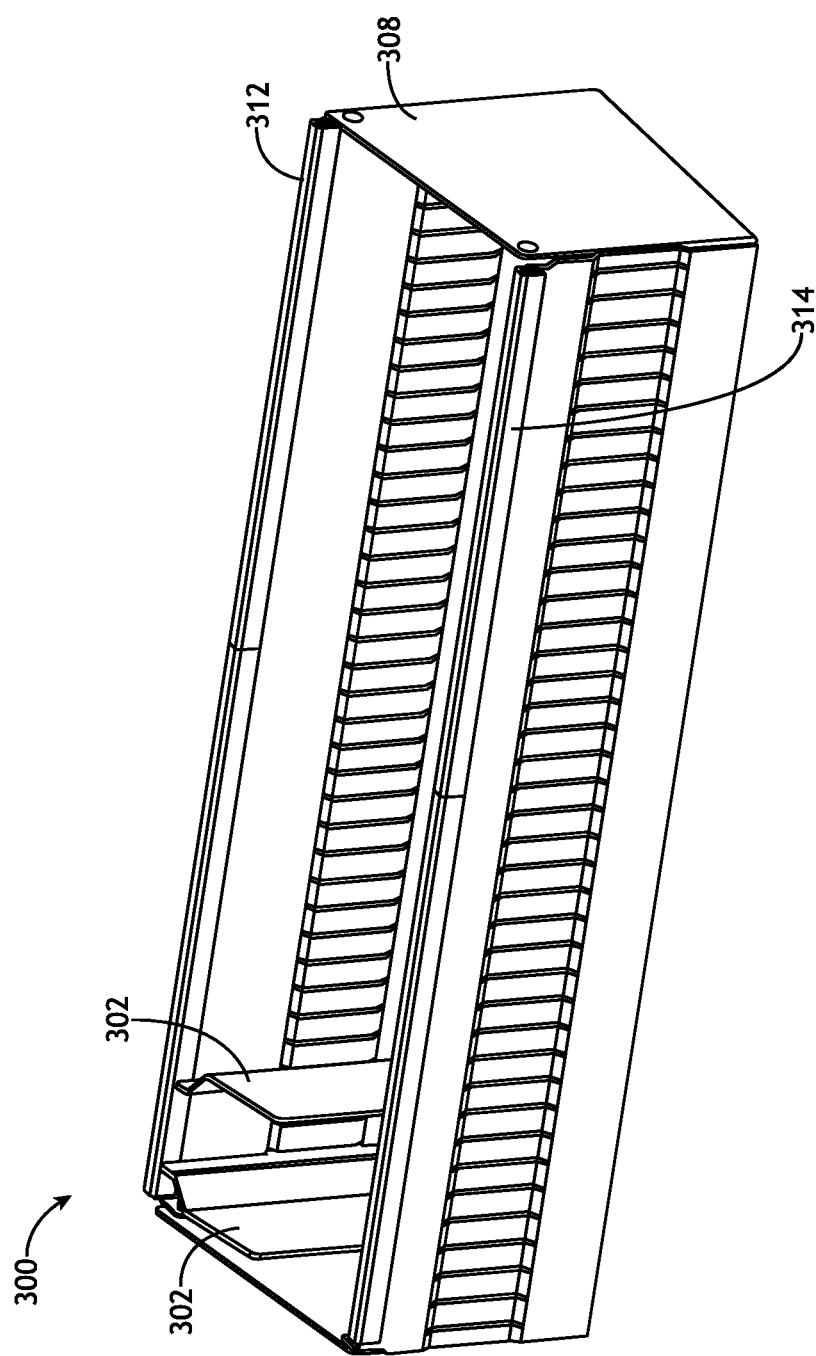
FIG. 20 is a perspective view of the adjustable powered driver holder, in accordance with one or more embodiments of this disclosure.
Figure 21A:
FIG. 21A is a top view of a repositionable support plate of the adjustable powered driver holder, in accordance with one or more embodiments of this disclosure.
Figure 21B:
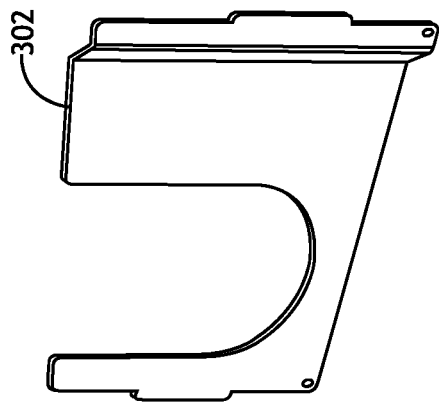
FIG. 21B is a perspective view of the support plate illustrated in FIG. 21A, in accordance with one or more embodiments of this disclosure.
Figure 21C:
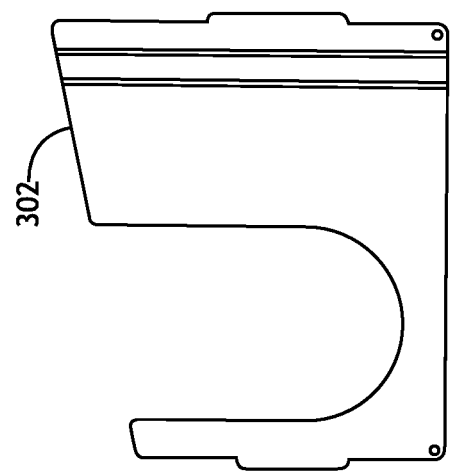
FIG. 21C is a perspective view of the support plate illustrated in FIG. 21A, in accordance with one or more embodiments of this disclosure.
Figure 21D:
FIG. 21D is a front view of the support plate illustrated in FIG. 21A, in accordance with one or more embodiments of this disclosure.
Figure 22B:
FIG. 22B is a perspective view of the support plate illustrated in FIG. 22A, in accordance with one or more embodiments of this disclosure.
Figure 22D:
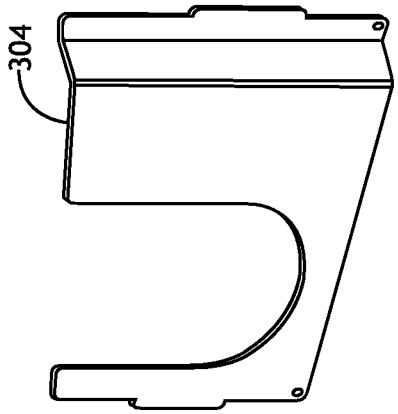
FIG. 22D is a front view of the support plate illustrated in FIG. 22A, in accordance with one or more embodiments of this disclosure.
Figure 22A:
FIG. 22A is a top view of another repositionable support plate of the adjustable powered driver holder, in accordance with one or more embodiments of this disclosure.
Figure 22C:
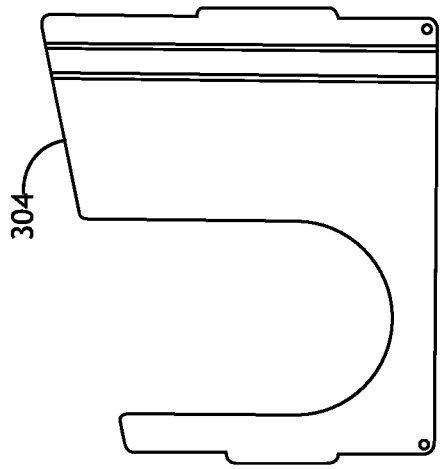
FIG. 22C is a perspective view of the support plate illustrated in FIG. 22A, in accordance with one or more embodiments of this disclosure.

In embodiments, the bin 308 is an open top horizontal box, and the support plates 302, 304 include sets of left and right hand support plates with opposing curvatures. Because of their opposing curvatures, a set of support plates 302, 304 forms a holster for receiving a powered driver 306 therebetween. This allows for control and placement of drivers 306, 306' in a linear orientation from each other providing the operator the ability to grab each driver handle easily. The ability to selectively space apart support plates 302, 304 allows drivers of different sizes and shapes to be placed as close or as far apart as the operator chooses. The opposing left and right plate sets (plates 302, 304, plates 302', 304', etc.) can hold drivers 306, 306' next to each other, or a space can be left in-between the sets to create an additional empty cavity to hold drivers. These open spaces can hold any driver style, but a larger square space works well for linear or battery powered drivers to be held in a resting position on the battery base. As shown in FIG. 18, all drivers 306, 306' can be controlled or set in location to be in a presented position for simple and quick grip access to operator.

The bin 308 includes a bottom and four sides to make an open box. The bin 308 may be constructed of metal or high density plastic. In embodiments, the bin 308 is rectangular in shape and can be sized for length to hold from two drivers 306 to multiple drivers 306, all held in linear pattern next to each other. In some embodiments, the lateral ends of the bin 308 may be eliminated from the design; however, they may help to provide simple construction stability. The lateral ends also provide a surface to mount a linear slide 309 that allows the mounting box to move in and out of a dedicated compartment or shelf space, like a drawer. This ability to move in and out from a location allows the operator to move the entire assembly (holder 300) out, or towards themselves so the drivers 306 are easier to reach and then the assembly (holder 300) can be pushed back in to keep the assembly (holder 300) and the drivers 306 out of the way when not in use. This is important if the assembly is mounted within a cupboard.

Each of the repositionable support plates 302, 304 may have a single bend in an approximate 45 degree angle; however, this angle can vary. The support plates 302, 304 are designed to form an inverted V-shaped or U-shaped pattern when the left (302) and right (304) side support plates are mounted next to each other. The opposing plates 302, 304 create an inverted V-shaped or U-shaped space in which to place the driver body/head. These plates 302, 304 can be mounted within grooves 310, as shown, or they can be attached to the base of the bin 308 by fasteners (e.g., screws, or the like), using a tab on the plates 302, 304, providing a screw hole mount and attaching into limitless positions along a linear slot in the base. Numerous mechanical means may be used to mount the individual plates.

In some embodiments, the holder 300 may include edge fittings 312, 314 configured to slide over the upper edges of the front and rear sides of the bin 308 after the plates 302, 304 are mounted within the grooves 310. The edge fittings 312, 314 may help stabilize the plates 302, 304 within the grooves 310 and prevent them from slipping or being knocked out of position.

The inverted V-shaped or U-shaped space created by placement of the left and right hand support plates 302, 304 to control the top left and top right of the driver 306 then has extensions that come down in a variable length. The left and right hand plates 302, 304 are mounted at a distance to form a stop on the outer left and right side of the driver 306. The contact points serve as two of the capture positions to control the placement of the driver 306. The third contact point of the driver may be the bottom of the rectangular bin 308, where the driver handle is left free-standing in a slightly raised position, being captured by the left and right plates 302, 304 so that left to right motion of the driver 306 is prevented and the weight of the driver 306 is held by the base of the bin 308. The drivers 306 can also be controlled by using the opposing left and right hand plate sets with the point of contact being the top rim of the bin 308, which is proximal to the operator.

Linear drivers can be held by either leaving a void in between the left and right hand plate sets where the linear driver is held in position by placing the bottom of the driver in the distal bottom corner and the top resting on the top proximal lip of the bin 308, or they can be held in the same void space with two drivers held by mounting either the left or right support plate 302/306 to create two compartments both proximal and distal in the same void space. If two drivers are controlled in the same space in this manner, they will be set into each void space with the handle facing out of the bin 308 to be presented to the operator for easy gripping and use.

Referring now to FIGS. 23 through 32D, an upright screwdriver holder 400 is disclosed. In embodiments, the upright screwdriver holder 400 includes an upper support member 402 and one or more lower support members 406, 406', 406" configured to be suspended from a peg board or any other wall-type surface. The upper support member 402 includes at least one opening 404 configured to receive a distal end of a tool 410 (e.g., screwdriver or other shaft-type tool). In some embodiments (e.g., FIG. 25), the upper support member 402 includes a plurality of openings 404, 404', 404" configured to receive distal ends of a plurality of screwdrivers 410, 410', 410" respectively. Each of the lower support members 406, 406', 406" has a respective cradle 408, 408', 408" configured to support a proximal end of a tool 410, 410', 410" (e.g., screwdriver) that is extends from the cradle to the respective opening 404, 404', 404" in the upper support member 402. The lower support members 406, 406', 406" have differing dimensions. For example, each of the lower support members 406, 406', 406" may be configured to extend a different length outwardly from the peg board so that its cradle 408, 408', 408" is aligned with a respective one of the openings 404, 404', 404" in the upper support member 402. In addition, each of the lower support members 406, 406', 406" may be configured to be suspended from the peg board at a different height for differing lengths of tools 410, 410', 410", or for easier access to and/or viewability of the tools 410, 410', 410". The openings 404, 404', 404" of the upper support member 402 may be extend outwardly from the peg board in a linear fashion, such that each of the openings 404, 404', 404" is a different distance from the peg board.

The holder 400 can be used to hold in place an upright screwdriver or any other linear style tool having a shaft (e.g., a shaft which extends from the handle such as a screwdriver or hex wrench). The holder 400 positions each tool in individual locations for easy viewing and retrieval and return by operator. The holder 400 supports the tools in an upright orientation for open viewing to help identify tools for proper selection and reduces space requirements above and below apparatus for tool removal versus a standard holder which requires shaft to be inserted into a hole until it can be secured by the tool handle (i.e., in an inverted position). Inverted tool holders require free space above the holder to equal the shaft length plus the tool length so that the tool can be withdrawn to remove the tool from the holder. By contrast, the upright screwdriver holder 400 wall space requirements include length of tool plus only one to two inches to release the tool from the holder if wall space hanging conservation is desired.

Figure 26:
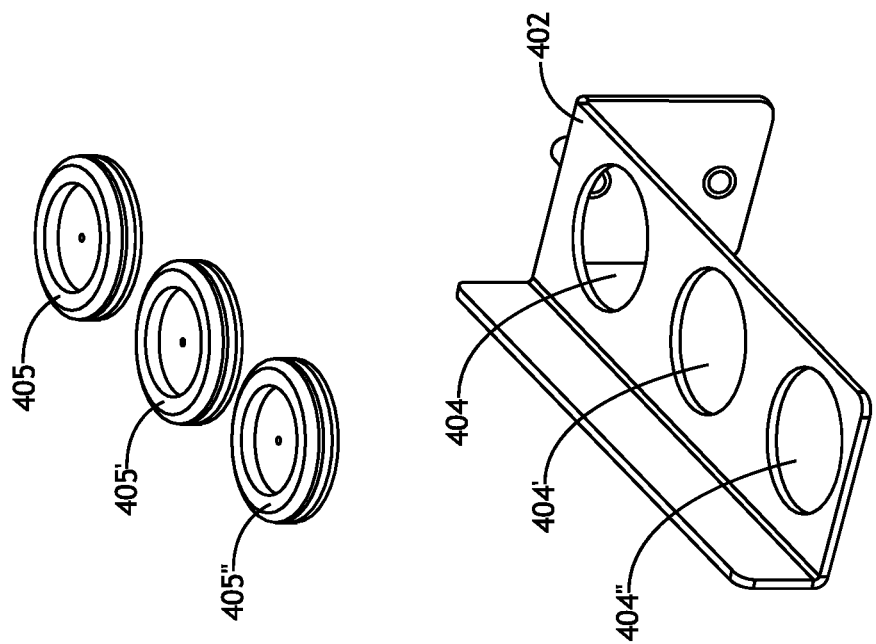
FIG. 26 is an exploded perspective view of an upper support member of the upright screwdriver holder, in accordance with one or more embodiments of this disclosure.
Figure 28B:
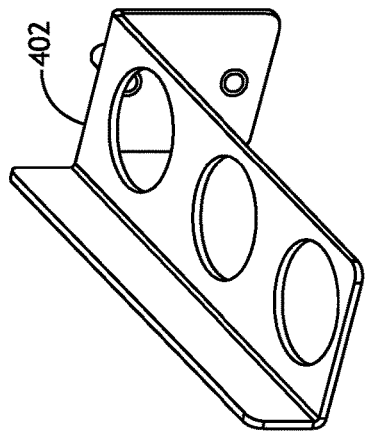
FIG. 28B is a perspective view of the upper support member illustrated in FIG. 28A, in accordance with one or more embodiments of this disclosure.
Figure 28D:
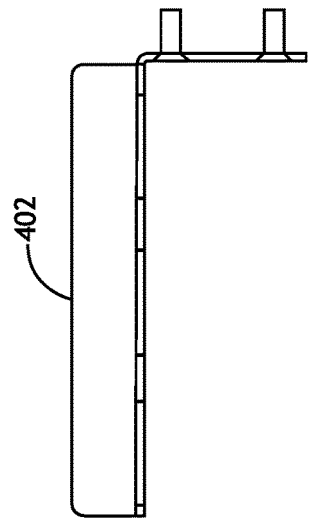
FIG. 28D is a side view of the upper support member illustrated in FIG. 28A, in accordance with one or more embodiments of this disclosure.
Figure 28A:
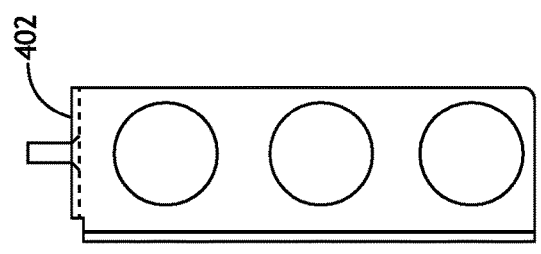
FIG. 28A is a top view of an upper support member of the upright screwdriver holder, in accordance with one or more embodiments of this disclosure.
Figure 28C:
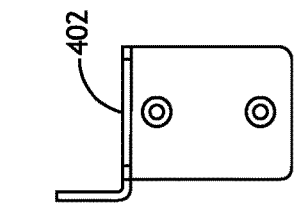
FIG. 28C is a front view of the upper support member illustrated in FIG. 28A, in accordance with one or more embodiments of this disclosure.
Figure 29B:
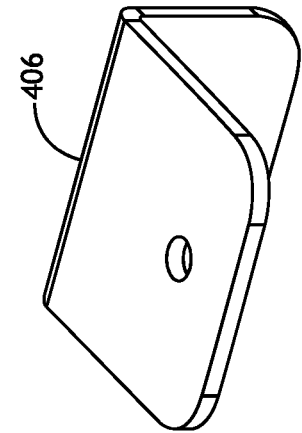
FIG. 29B is a perspective view of the lower support member illustrated in FIG. 29A, in accordance with one or more embodiments of this disclosure.
Figure 29D:
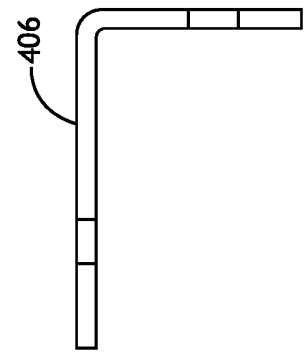
FIG. 29D is a side view of the lower support member illustrated in FIG. 29A, in accordance with one or more embodiments of this disclosure.
Figure 29A:
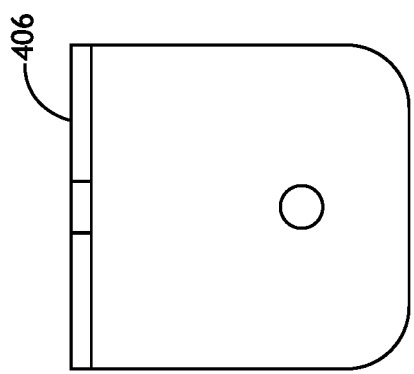
FIG. 29A is a top view of a lower support member of the upright screwdriver holder, in accordance with one or more embodiments of this disclosure.
Figure 29C:
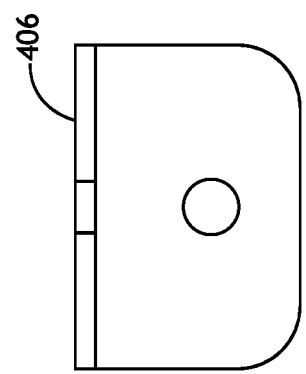
FIG. 29C is a front view of the lower support member illustrated in FIG. 29A, in accordance with one or more embodiments of this disclosure.
Figure 30B:
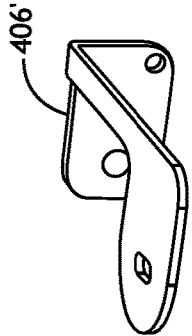
FIG. 30B is a perspective view of the lower support member illustrated in FIG. 30A, in accordance with one or more embodiments of this disclosure.
Figure 30D:
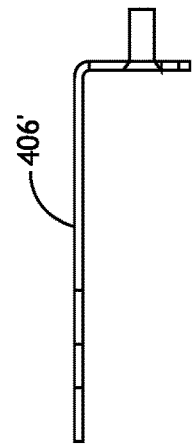
FIG. 30D is a side view of the lower support member illustrated in FIG. 30A, in accordance with one or more embodiments of this disclosure.
Figure 30A:
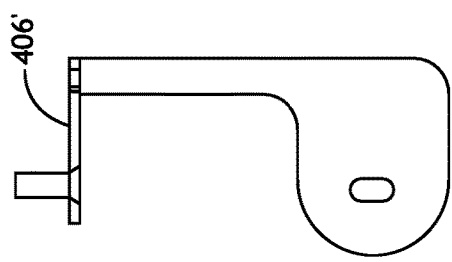
FIG. 30A is a top view of another lower support member of the upright screwdriver holder, in accordance with one or more embodiments of this disclosure.
Figure 30C:
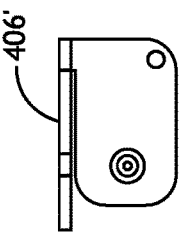
FIG. 30C is a front view of the lower support member illustrated in FIG. 30A, in accordance with one or more embodiments of this disclosure.
Figure 31B:
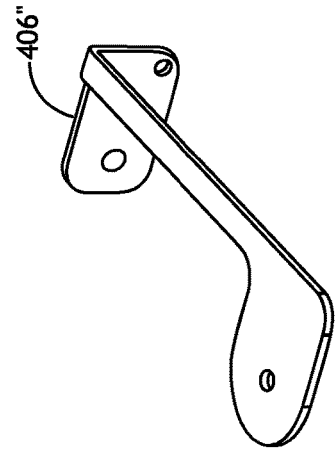
FIG. 31B is a perspective view of the lower support member illustrated in FIG. 31A, in accordance with one or more embodiments of this disclosure.
Figure 31D:
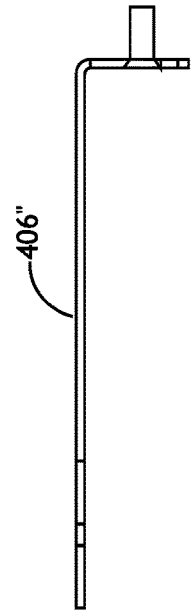
FIG. 31D is a side view of the lower support member illustrated in FIG. 31A, in accordance with one or more embodiments of this disclosure.
Figure 31A:
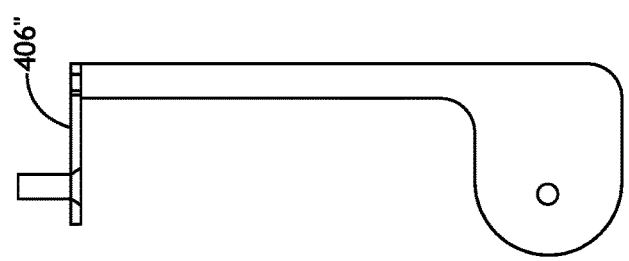
FIG. 31A is a top view of another lower support member of the upright screwdriver holder, in accordance with one or more embodiments of this disclosure.
Figure 31C:
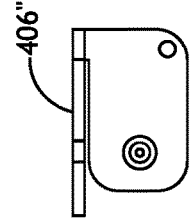
FIG. 31C is a front view of the lower support member illustrated in FIG. 31A, in accordance with one or more embodiments of this disclosure.
Figure 33:
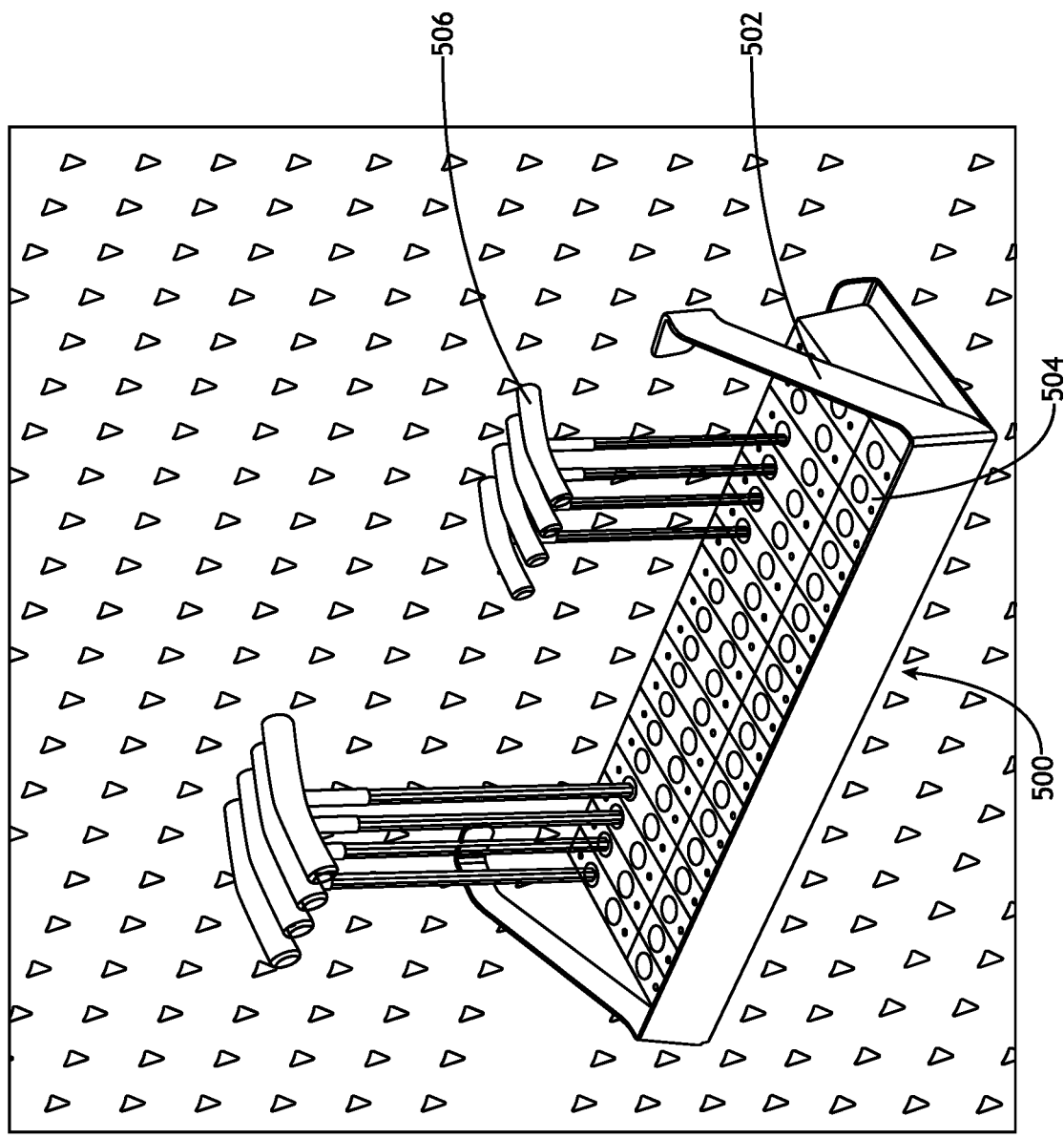
FIG. 33 is a perspective view of a multi-position shaft-type hand tool holder coupled to a peg board of the vertical toolbox, in accordance with one or more embodiments of this disclosure.
Figure 34:
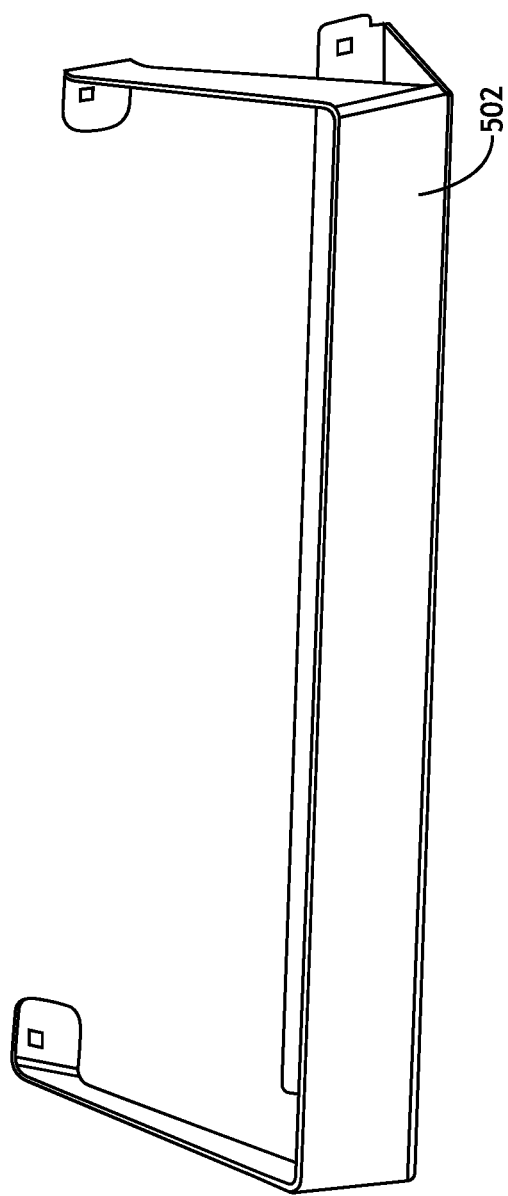
FIG. 34 is a front perspective view of a support frame of the shaft-type hand tool holder, in accordance with one or more embodiments of this disclosure.

The holder 400 may be configured to hold one or several tools (e.g., screwdrivers 410) in a row. For example, FIG. 26 illustrates an embodiment of the upper support member 402 configured to hold a plurality of tools; however, in other embodiments (e.g., FIGS. 32A through 32C), the upper support member 402 may be configured with a single opening 404 for holding only one tool. The tools are held off of a wall-type surface (e.g., peg board) and spaced apart for easy operator access. The holder 400 is designed in at least two parts (an upper support member 402 and at least one lower support member 406) to accommodate any length of tool being held. This makes the holder 400 universal to most hand tools with structural similarity to screwdrivers.

In embodiments, the holder 400 may require two parts (an upper support member 402 and a lower support member 406) per tool being controlled, though can be made in one piece with a connected upper support member 402 and lower support member 406 if tool length adjustments are not required. The embodiments illustrated in the drawings include both an upper support member 402 and at least one lower support member 406. The upper support member 402 is mounted to a wall-type surface (e.g., peg board) to control the shaft end of a tool (e.g., distal end of a hex wrench, screwdriver, surgical cautery probe, or the like) along with a lower support member 406 mounted and aligned directly below the upper support member 402 to hold the bottom of a handle (e.g., proximal end of hex wrench, screwdriver, surgical cautery probe, punch, chisel, or the like). This alignment and capture system allows gravity, along with the proximal end resting on the lower support member 406, plus weight of the hand tool 410 to cause the tool 410 to be supported in an upright position (i.e., with the distal end of the tool pointing upwardly).

The upper support member 402 includes at least one opening/hole 404 for the tool shaft to be inserted. The support member 402 can be mounted to a wall surface by any means to keep the hole 404 at a set position. For example, the upper support member 402 may be configured to be suspended from a peg board (e.g., by cooperatively shaped pegs). In some embodiments, the upper support member 402 may employ a standard bolt and nut, or any other type of wall mounting mechanism. In embodiments, the upper support member 402 may be formed from piece of metal (e.g., steel) that has an opening 404 (e.g., a hold) for controlling the tool shaft and at least one other opening (e.g., hole) for mounting the upper support member 402 to a wall surface. The portion of the upper support member 402 that includes the opening 404 configured to receive the tool shaft may be perpendicular (e.g., at a 90-degree angle) to the portion of the upper support member 402 that includes the mounting hole (or pegs). Additional metal can be used to form a C-channel if desired (e.g., as shown in FIGS. D). The C-channel may provide a surface to attach a tool identifying sticker or label. This tab can also extend from another other appropriate surface to allow for label placement in a visually desired location.

The upper support member 402 can be made from any thin material and held to a wall-type surface by any mechanical means. The material is intended to be thin to allow the shaft end of the tool 410 to be easily removed by the operator. It can also be made from a flat plastic piece with a hole to extend the shaft through and a hole to mount.

In embodiments (e.g., FIG. 26), the upper support member 402 may include grommet style inserts 405, 405', 405" (e.g., plastic/rubber annular inserts) to further control the tool shaft an upright position and also serve to protect the tool and baffle sound of the tool trying to move when the apparatus is attached to a mobile wall-type surface (e.g., to a support panel 70 of the toolbox 10). The grommets 405, 405', 405" may be open or include a diaphragm for custom hole cutting to match shaft size/shape or can be slit to allow multiple tool shaft styles to be inserted. This diaphragm further controls the tool 410 in an upright position.

As shown in FIG. 27, the lower support member 406 includes or is coupled to a cradle 408 formed by a concave shaped cup-like curved surface, which may have a circular perimeter. The cradle 408 is configured to engage with the handle bottom end (i.e., proximal end) of the tool 410 in a circular contact holding control action. In embodiments, the cradle 408 may be an open inverted end of a suction cup or other custom inverted cupped shape holder. The cradle 410 may formed from rubber or made of a smooth material that may be treated with a non-slip coating, such as rubber or another type of polymer coating.

The lower support member 406 may also be configured to be suspended from a peg board (e.g., by cooperatively shaped pegs). In some embodiments, the lower support member 406 may employ a standard bolt and nut, or any other type of wall mounting mechanism. In embodiments, the lower support member 406 may be formed from piece of metal (e.g., steel) that has an opening (e.g., hole) other interface for connecting with the cradle 408 and at least one other opening (e.g., hole) for mounting the lower support member 406 to a wall surface. The portion of the lower support member 406 that holds the cradle 408 may be perpendicular (e.g., at a 90-degree angle) to the portion of the lower support member 406 that includes the mounting hole (or pegs).

Figure 25:
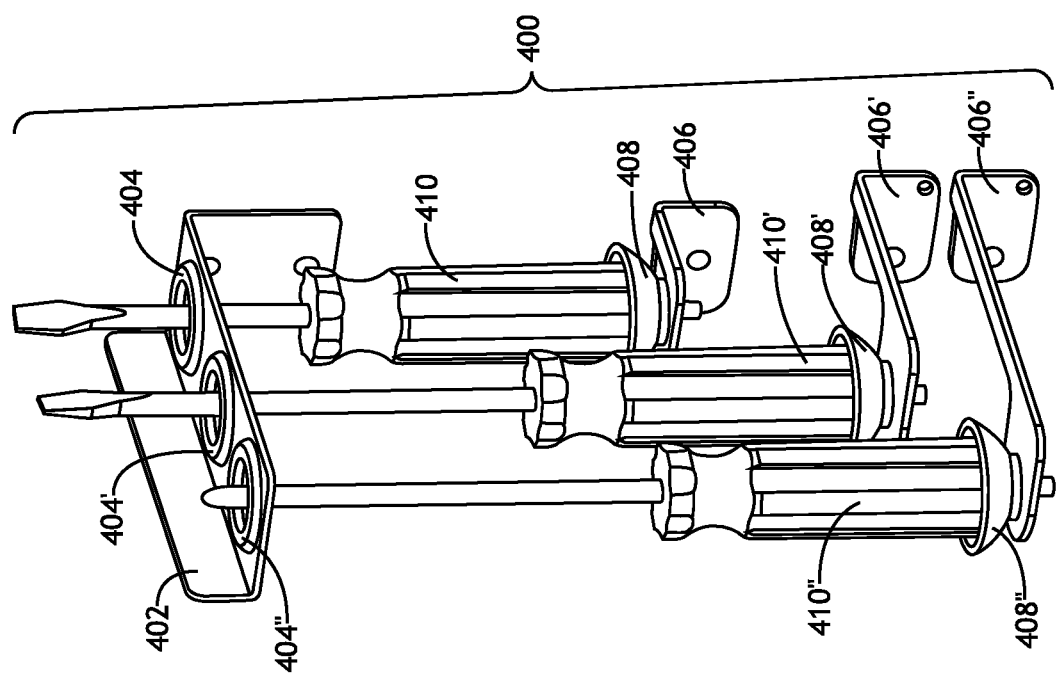
FIG. 25 is a perspective view of the upright screwdriver holder, in accordance with one or more embodiments of this disclosure.

As shown in FIG. 25, the use of separate lower support members 406, 406', 406" allows for universal use for different length tools 410. The upper support member 402 is used to control the top tool shaft to be held in a vertical upright position above the tool handle. Each lower support member 406, 406', 406" is aligned a corresponding opening 404, 404', 404" in the upper support member 402 below and below the corresponding tool 410, 410', 410" to keep weight distribution and gravity controlled. The combination of upper and lower support members controls the tools with a solid hold, stopping tools from slipping from holder 400 and presenting tools for easy identification and individual placement.

Figure 23:
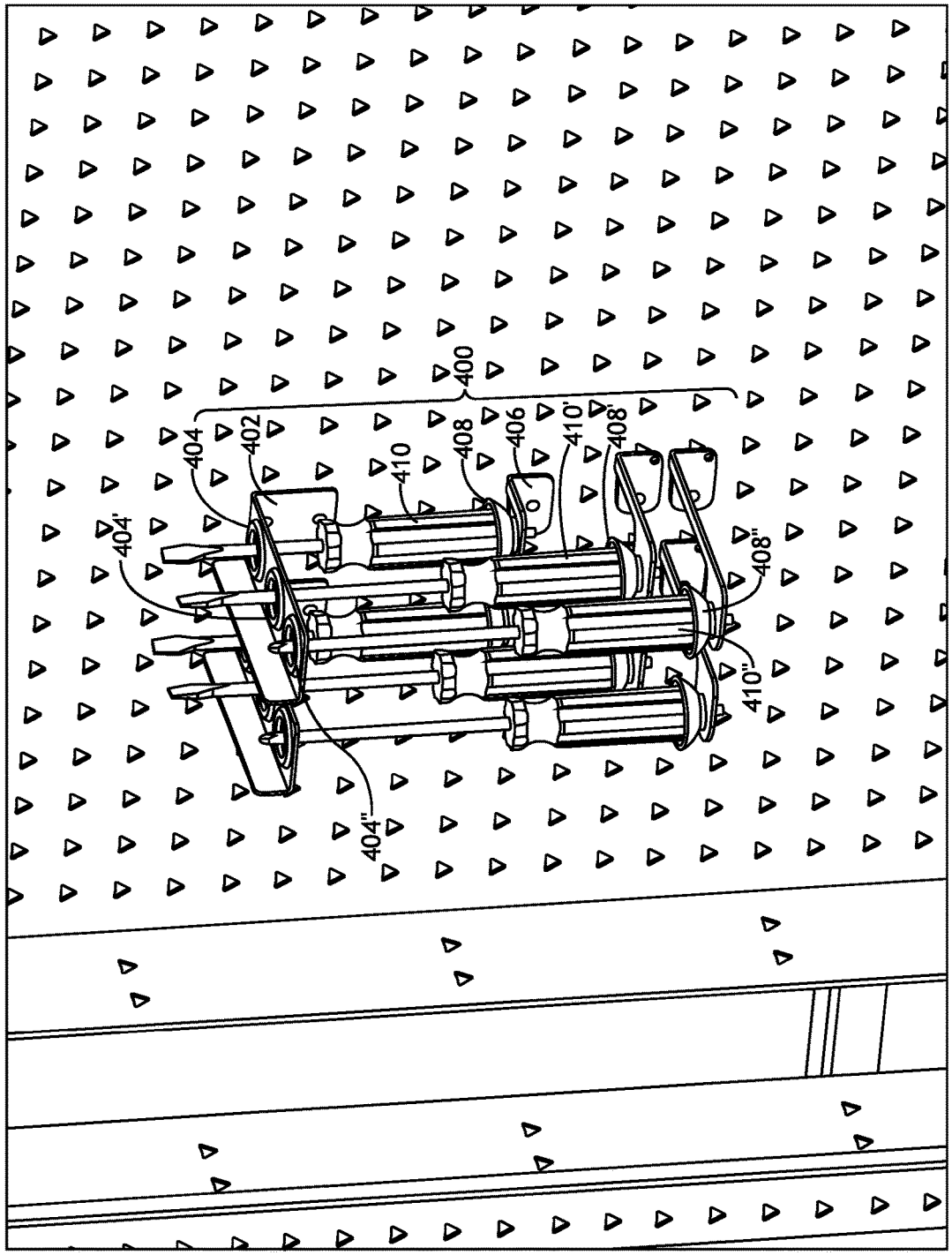
FIG. 23 is a perspective view of an upright screwdriver holder coupled to a peg board of the vertical toolbox, in accordance with one or more embodiments of this disclosure.
Figure 24:
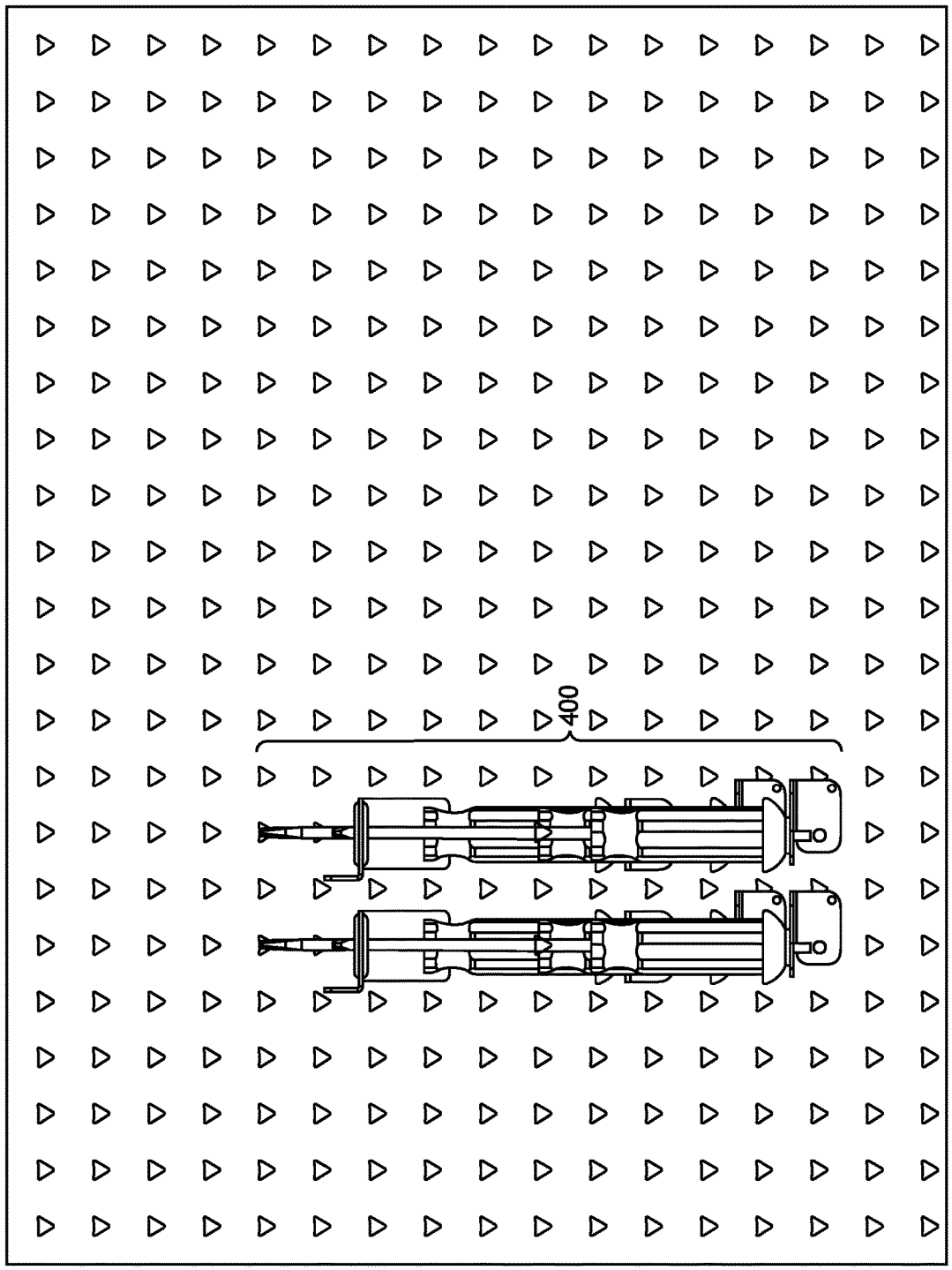
FIG. 24 is a front view of the upright screwdriver holder coupled to a peg board of the vertical toolbox, in accordance with one or more embodiments of this disclosure.

The combination of upper and lower support members can be used as singular sets or in sets extending off of a vertical wall-type surface (e.g., wall, peg board, etc.). This allows multiple tools 410, 410', 410" to be held in the same horizontal space from the wall-type surface. This saves wall space by allowing multiple tools 410, 410', 410" to extend from the wall-type surface (e.g., as shown in FIGS. 23 and 24). Upward motion is used to remove the tool handle from the cradle 408 and then a sideways motion to move the handle horizontally from the cradle 408 to release the bottom of the tool and then pull tool shaft from the opening 404 in the upper support member 402 for complete removal. A reverse motion can be used to place a tool 410 into the holder 400. In embodiments, it may be desirable to have to lower support member 406 positioned to hold the tool 410 (e.g., screwdriver) so that the tool tip only extends out of the opening 404 in the upper support member 402 by about one inch.

In FIGS. 23 through 25, the lower support members 406, 406' 406" demonstrate the ability to have lower support members 406, 406', 406" used at different heights for different length of tools 410, 410', 410" being held. Alternatively, the lower support members 406, 406', 406" can be mounted in the same plane. Both the lower support members 406, 406', 406" and upper support member 402 can be used in current demonstration position or inverted to allow for label placement preference to change or to allow removal of the tool shaft from the left or right side of the holder 400.

In embodiments, multiple or single tool holders 400 can be placed at increments apart from each other on peg board or any wall surface with holes or other attachment means. This allows tools 410 to be placed across a vertical wall surface in a space saving manor with easy access to the operator with the distance separating the holders 400 determined by the operator requirements to allow the operators' hands to easily reach the individual tools 410.

Figure 35:
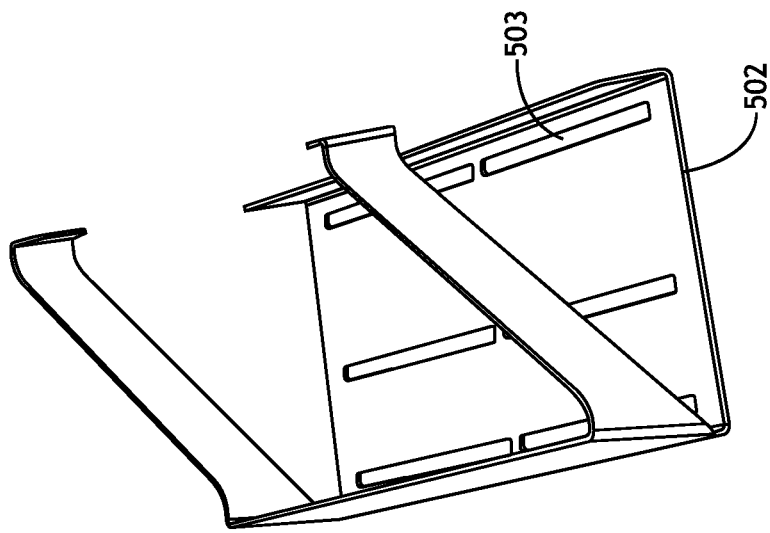
FIG. 35 is a side perspective view of a support frame of the shaft-type hand tool holder, in accordance with one or more embodiments of this disclosure.
Figure 36:
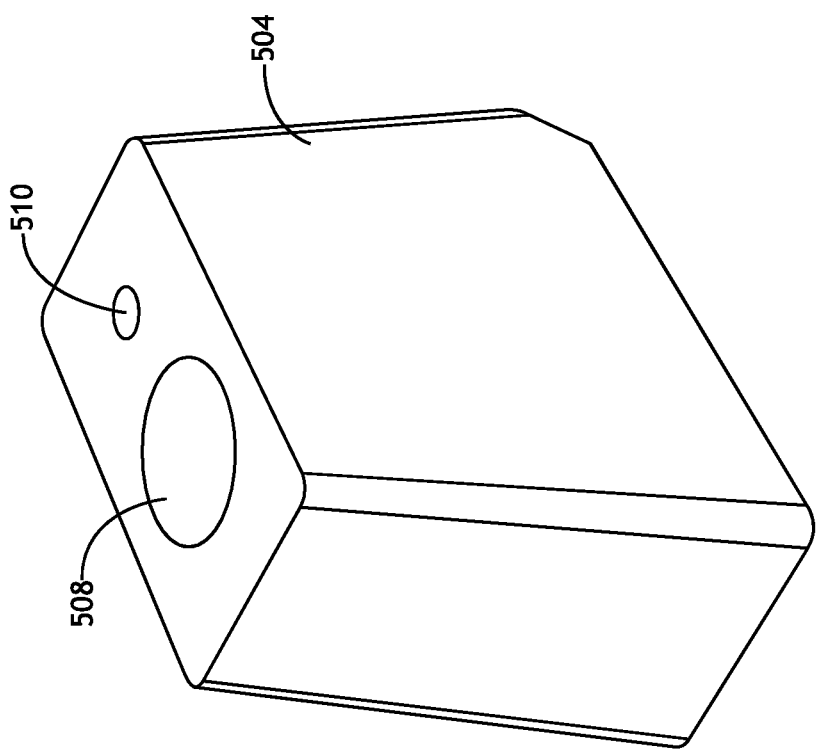
FIG. 36 is a perspective view of a tool support block of the shaft-type hand tool holder, in accordance with one or more embodiments of this disclosure.
Figure 37:
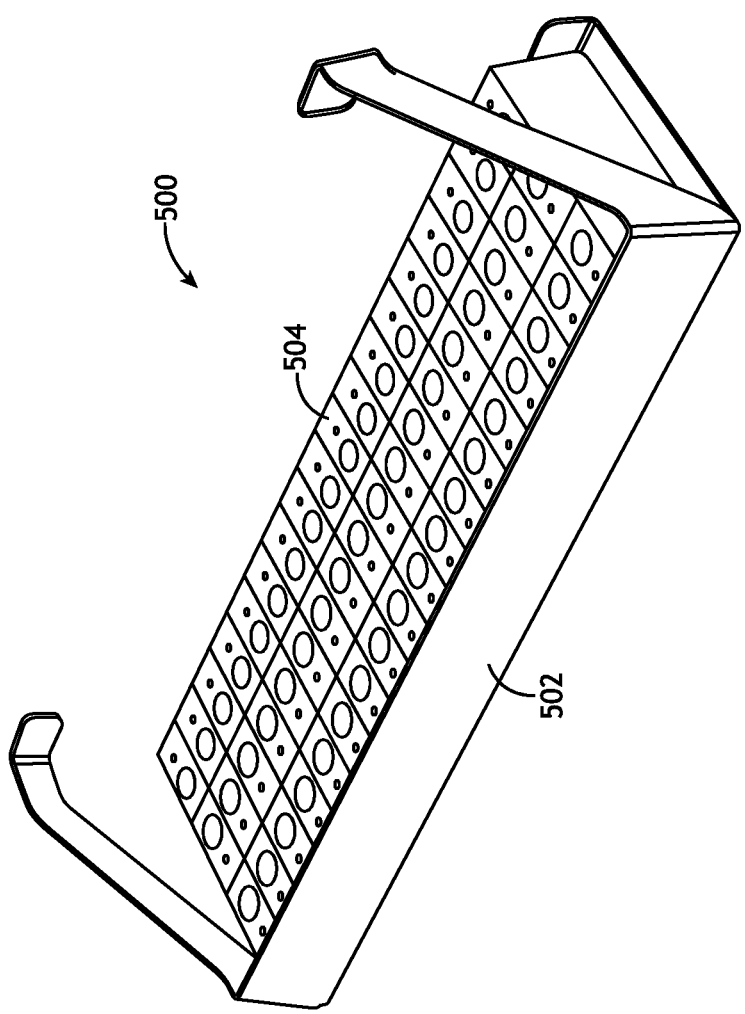
FIG. 37 is a perspective view of the shaft-type hand tool holder including a plurality of tool support blocks that are carried by the support frame, in accordance with one or more embodiments of this disclosure.
Figure 38:
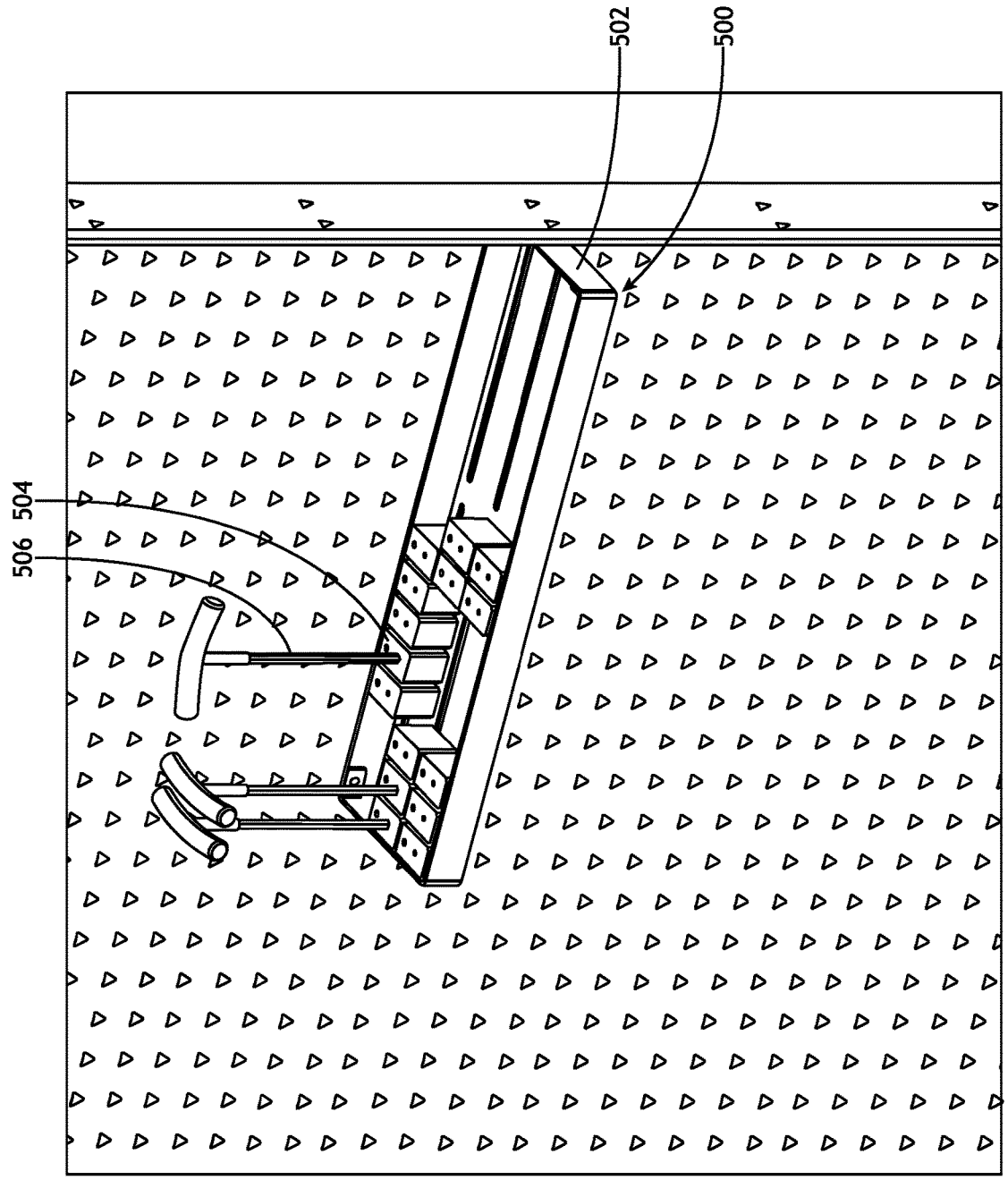
FIG. 38 is another perspective view of a multi-position shaft-type hand tool holder coupled to a peg board of the vertical toolbox, in accordance with one or more embodiments of this disclosure.
Figure 39:
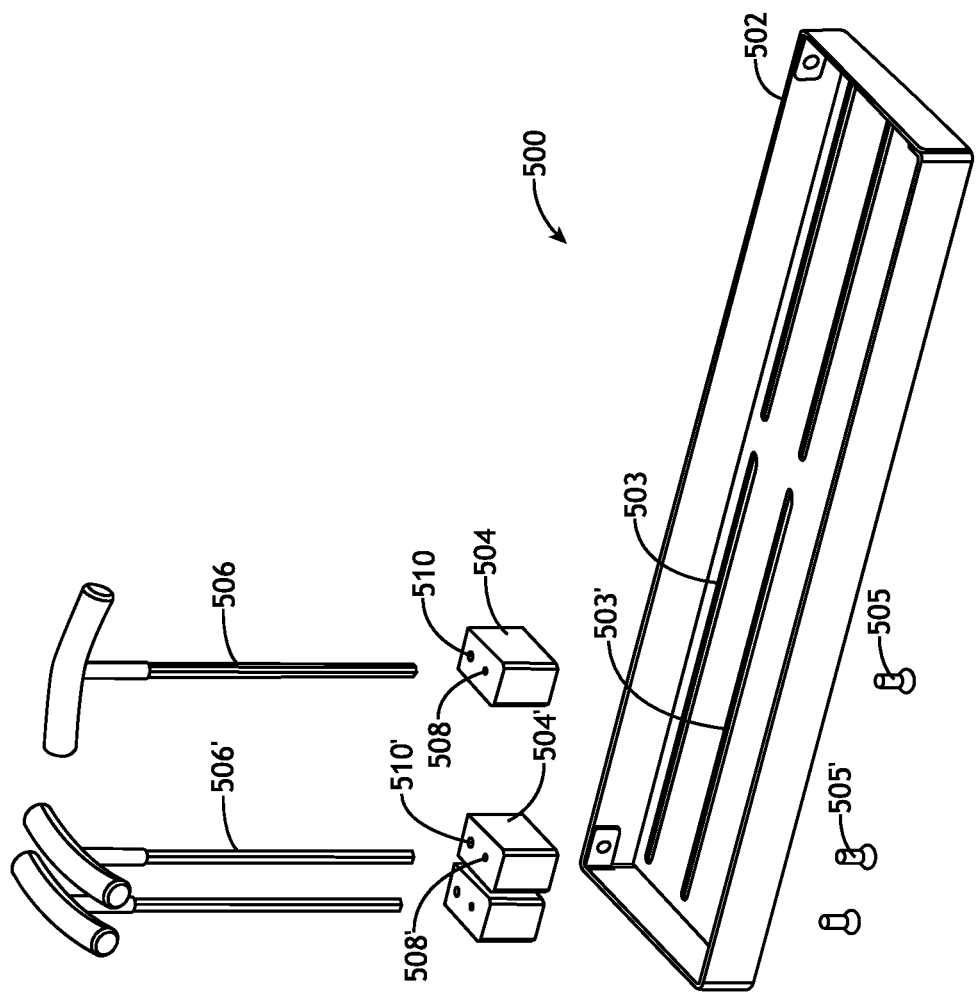
FIG. 39 is an exploded perspective view of the shaft-type hand tool holder, in accordance with one or more embodiments of this disclosure.
Figure 40B:
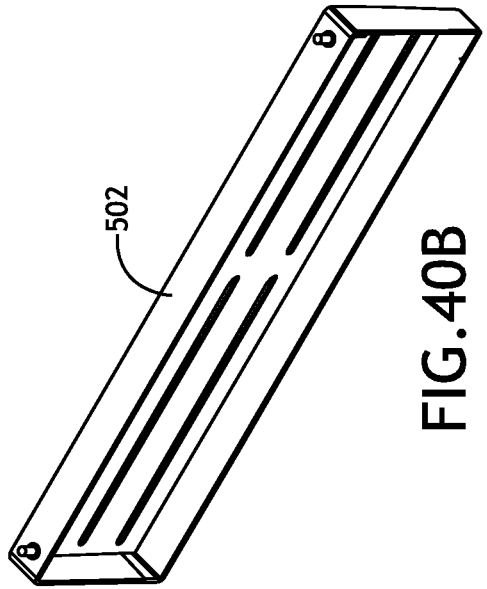
FIG. 40B is a perspective view of the support frame illustrated in FIG. 40A, in accordance with one or more embodiments of this disclosure.
Figure 40D:
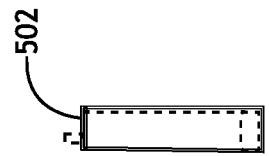
FIG. 40D is a side view of the support frame illustrated in FIG. 40A, in accordance with one or more embodiments of this disclosure.
Figure 40A:
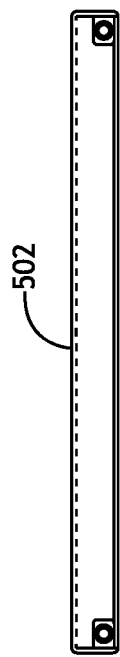
FIG. 40A is a rear view of a support frame of the shaft-type hand tool holder, in accordance with one or more embodiments of this disclosure.
Figure 40C:
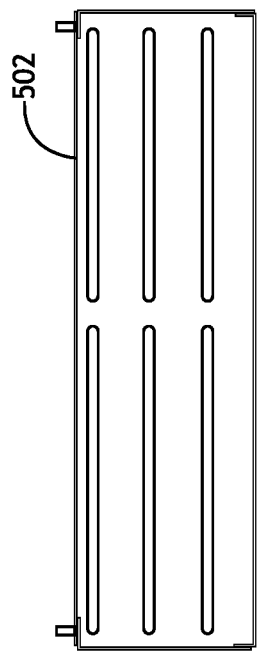
FIG. 40C is a top view of the support frame illustrated in FIG. 40A, in accordance with one or more embodiments of this disclosure.
Figure 41C:
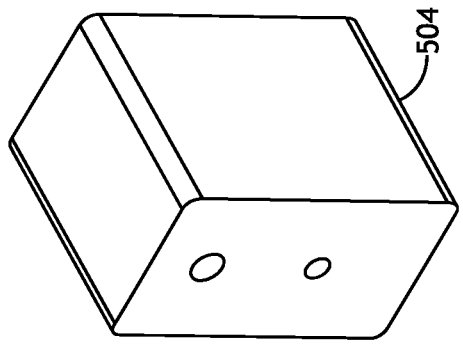
FIG. 41C is a perspective view of the tool support block illustrated in FIG. 41A, in accordance with one or more embodiments of this disclosure.
Figure 41B:
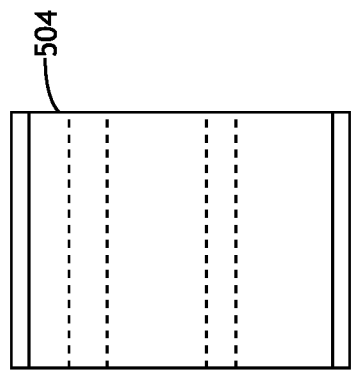
FIG. 41B is a side view of the tool support block illustrated in FIG. 41A, in accordance with one or more embodiments of this disclosure.
Figure 41A:
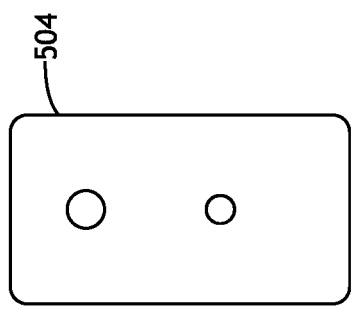
FIG. 41A is a top view of a tool support block of the shaft-type hand tool holder, in accordance with one or more embodiments of this disclosure.

Referring now to FIGS. 33 through 41C, a multi-position shaft-type hand tool holder 500 is disclosed. In embodiments, the shaft-type hand tool holder 500 includes a support frame 502 configured to be suspended from a peg board or any other wall-type surface. As shown in FIG. 35, the support frame 502 includes one or more linear slots 503 formed along a bottom portion of the support frame 502. Referring now to FIG. 39, the shaft-type hand tool holder 500 further includes a plurality of tool support blocks 504, 504' configured to be fastened to the support frame 502 by fasteners 505, 505' extended through the one or more slots 503, 503' along the bottom of the support frame 502. Each of the tool support blocks 504, 504' includes a cavity 508, 508' configured to receive a distal end (i.e., the shaft end) of a shaft-type hand tool 506, 506'.

The multi-position shaft-type hand tool holder 500 allows for placement and control of individual hand tool shafts, allowing both location placement variations and shaft size variation order of placement for desired operator interface. The shaft-type hand tool holder 500 includes a flat plane which can either be a bottom surface of a box (FIG. 38 through 40C) or flat plate (FIGS. 33 through 37) support frame 502. This support frame 502 can have individual holes or slots 503 to allow for multiple placement options of individual tool shaft holders (tool support blocks 504). The support frame 502 can be mounted to a wall-type surface (e.g., wall, peg board, or the like) by any mechanical means (e.g., pegs, nuts and bolts, etc.).

In embodiments, the tool support blocks 504 are made from a high-density plastic but can also be made from any easily machined material. The individual blocks 504 can be any shape but require a depth that can support the weight and stability required to control the weight of the hand tool shaft. In an example embodiment, the tool support blocks 504 are HOPE plastic rectangular shaped pieces with a one-inch depth. The individual blocks 504, 504' allow for fasteners 503, 503' (e.g., screws) to position the individual blocks 504, 504' onto the support frame 502. The individual blocks 504, 504' may be drilled with enough depth and outside diameter cavities 508, 508' to allow the tool shafts of hand tools 506, 506' to be inserted into the cavities 508, 508' so that the tools 506, 506' are vertically disposed within the cavities 508, 508'. In other embodiments, the cavities 508, 508' may be drilled at an angle to allow the hand tool handles to present towards the operator.

This system allows a hand tool 506 with a shaft to be removed simply by lifting the tool 506 until it reaches a height where the inverted handle clears the area of tool holder 500 so that the operator can then move the shaft away from tool holder 500 in a horizontal motion. The holder 500 provides a secure hold while a tool 506 is in place so that when the assembly is mounted to a moving wall (e.g., support panel 70 of toolbox 10) the tool 506 will stay in place. The holder 500 can also be used to secure tools 506 that are mounted to a stationary wall. Additionally, the multi-position shaft-type hand tool holder 500 allows for many blocks 504 to be mounted in a space (e.g., FIG. 37) or any number of blocks holding any size of tool in any pattern preferred by the user (e.g., FIG. 38).

Referring now to FIGS. 42 through 44D, an angled box-end wrench holder 600 is disclosed. In embodiments, the angled box-end wrench holder 600 includes a mounting plate 604 configured to be suspended from a peg board or any other wall-type surface. The wrench holder 600 further includes wrench support plate 606 extending from the mounting plate 604 at an angle with a plurality of hooks 608 for hanging box-end wrenches 602 or other loop-ended tools therefrom. The angled fin-like construction of the wrench holder 600 provides individual hanging wrench locations while reducing linear wall space usage.

In embodiments, the mounting plate 604 and the wrench support plate 606 are formed from a continuous piece of material (e.g., metal, high-density plastic, or the like). The mounting plate portion 604 of the wrench holder 600 is designed to be attached to peg board or any other wall-type surface. The mounting plate portion 604 of the holder 600 is only needed to be large enough to provide mechanical means (e.g., pegs, nuts and bolts, etc.) to mount the holder 600 to the wall-type surface. The remainder of the wrench holder 600 (i.e., the wrench support plate 606) can be of any lateral length with any number of hooks 608 used to control/support hanging wrenches 602 by placing the closed ends of the wrenches 602 over the hooks 608 that are placed along the top edge of the wrench support plate portion 606 of the holder 600.

Figure 43B:
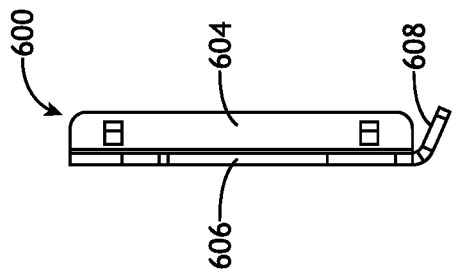
FIG. 43B is a side view of the angled box-end wrench holder illustrated in FIG. 43A, in accordance with one or more embodiments of this disclosure.
Figure 43C:
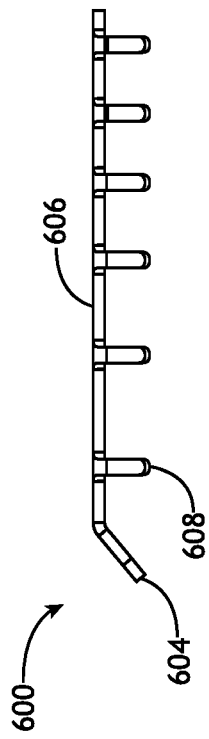
FIG. 43C is a top view of the angled box-end wrench holder illustrated in FIG. 43A, in accordance with one or more embodiments of this disclosure.
Figure 43A:
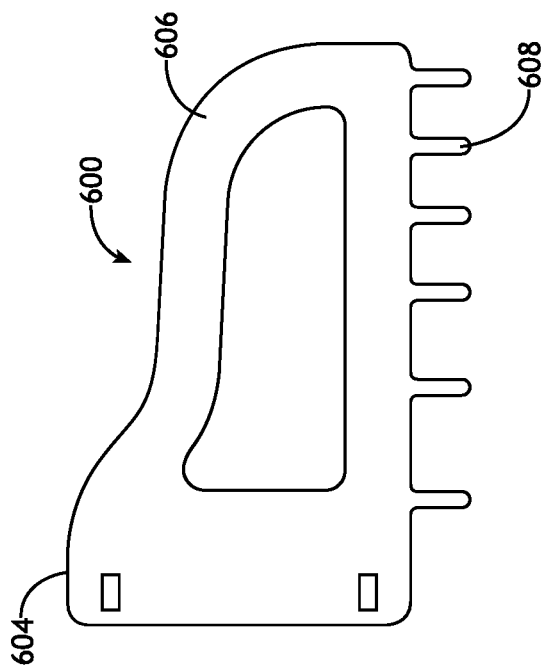
FIG. 43A is a rear view of an angled box-end wrench holder, in accordance with one or more embodiments of this disclosure.
Figure 44B:
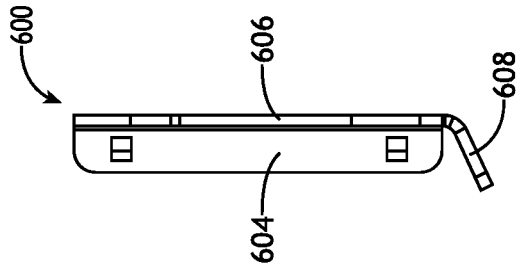
FIG. 44B is a side view of the angled box-end wrench holder illustrated in FIG. 44A, in accordance with one or more embodiments of this disclosure.
Figure 44D:
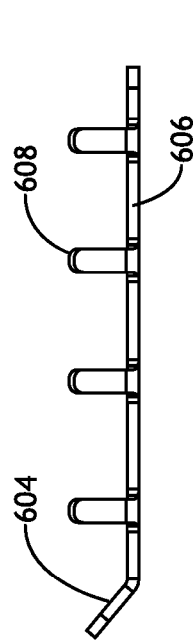
FIG. 44D is a top view of the angled box-end wrench holder illustrated in FIG. 43A, in accordance with one or more embodiments of this disclosure.
Figure 44A:
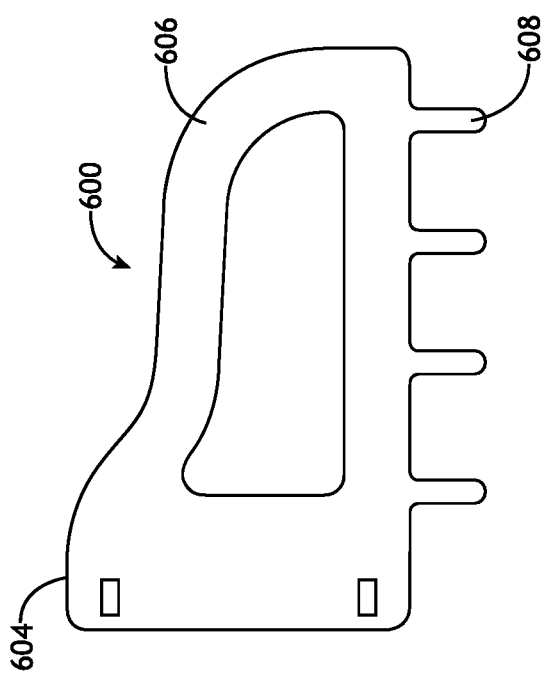
FIG. 44A is a front view of an angled box-end wrench holder, in accordance with one or more embodiments of this disclosure.
Figure 44C:
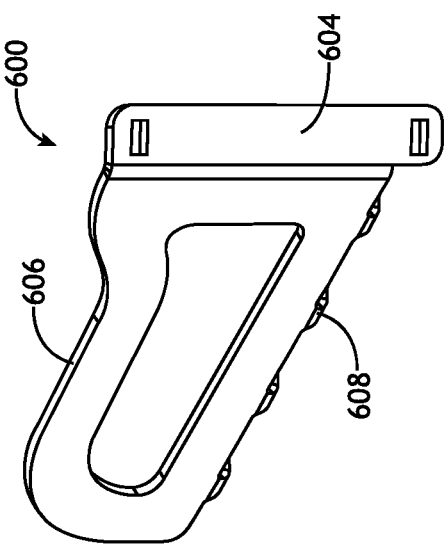
FIG. 44C is a perspective view of the angled box-end wrench holder illustrated in FIG. 43A, in accordance with one or more embodiments of this disclosure.

Each holder 600 can either be singular in construction with individual hooks 608 incorporated into the wrench support plate 606 at specific locations with specifically sized hooks 608 (e.g., as shown in FIG. 43A through 43C) or in a multi-piece main frame construction that allows individual hooks to be mounted to the main construction frame that can vary in size and location.

The singular construction holder 600 is bent at an angle (e.g., 20 to 90 degrees, or more preferably 30 to 60 degrees) to take the wrench support plate portion 606 of the holder 600 off the plane of the mounting plate portion 604 of the holder 600. This angle off of the mounting plane can vary to operator or wall constraint dimensions.

In some embodiments, a multi-piece construction of the holder 600 includes a main construction frame that mounts the holder 600 to the supporting wall surface and allows for individual hooks 608 to be placed on its surface. In such embodiments, the hooks 608 can be attached to the main construction frame by any mechanical means (e.g., nuts and bolts, slotted positioning, tongue and groove connections, etc.) between the main construction frame and the individual hooks 608.

Figure 42:
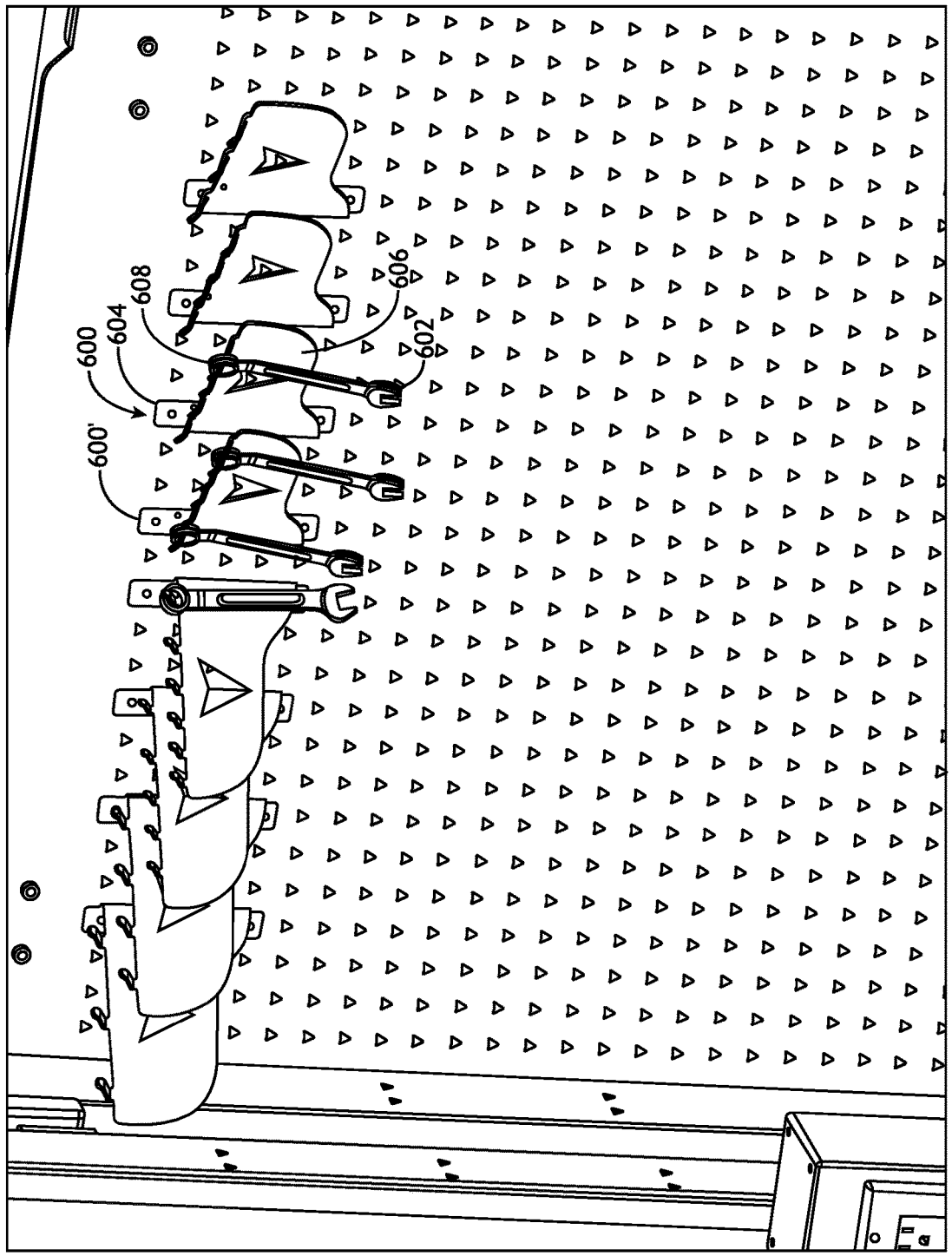
FIG. 42 is a perspective view of an angled box-end wrench holder coupled to a peg board of the vertical toolbox, in accordance with one or more embodiments of this disclosure.

Either style of the holder 600 can be mounted in a series across a wall-type surface (e.g., as shown in FIG. 42), placed at a distance in between each holder 600 to allow for easy wrench removal by operator. The holders 600 can be mounted in a linear pattern, diagonal pattern, or individually at desired locations. The holders 600 can be mounted to face the operator with both a left side wall attachment means (FIG. 43A through 43C) or a right side wall attachment means (FIGS. 44A through 44D). The individual holders 600 can be designed to hold wrenches 602 of any selected size in linear positions to present each tool for easy viewing, to see if tool is in place, and to allow for easy physical removal.

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A securable vertical toolbox, comprising:
   a vertically disposed frame;
   a plurality of wheels for transporting the vertically disposed frame;
   a plurality of support panels configured to extend horizontally from the vertically disposed frame, each of the support panels including a peg board configured to support tool supporting fixtures;
   an enclosure including a rear panel, a top panel, and two doors configured to surround the vertically disposed frame when the plurality of support panels are retracted into the vertically disposed frame and the two doors are secured, each of the two doors including a first panel configured to cover a side portion of the vertically disposed frame and a second panel configured to cover a front portion of the vertically disposed frame; and
   a locking mechanism for securing at least one of the two doors to the top panel and to a base of the vertically disposed frame with a cam rod, and to a drawer below the base of the vertically disposed frame with a lever that engages a top lip of the drawer when the lever is depressed by the cam rod.

2. The securable vertical toolbox of claim 1, wherein the first panel is perpendicular to the second panel.

3. The securable vertical toolbox of claim 1, wherein the first and second panels are reinforced with hat channels to add support, keep the first and second panels leveled, and prevent sagging.

4. The securable vertical toolbox of claim 1, further comprising one or more handles configured to extend from the side portion of the vertically disposed frame when the two doors are secured.

5. The securable vertical toolbox of claim 1, further comprising one or more RFID readers configured to detect RFID tags attached to tools when the tools are placed within or upon the tool supporting fixtures, thereby providing visible and electronic registration of tool location and proximity to the one or more RFID readers.

6. The securable vertical toolbox of claim 1, further comprising a camera configured to record activity when the two doors are unsecured.

7. The securable vertical toolbox of claim 1, wherein the tool supporting fixtures include an adjustable powered driver holder comprising:
   a bin; and
   a plurality of repositionable support plates configured to be selectively fixed within the bin so that any two of the repositionable support plates can be disposed a selected distance from one another within the bin in order to receive a powered driver therebetween.

8. The securable vertical toolbox of claim 1, wherein the tool supporting fixtures include an upright screwdriver holder comprising:
   an upper support member configured to be suspended from the peg board, the upper support member including an opening configured to receive a distal end of a screwdriver; and
   a lower support member configured to be suspended from the peg board, the lower support member having a cradle with a concave surface configured to support a proximal end of the screwdriver so that the distal end of the screwdriver points upwardly toward and through the opening in the upper support member.

9. The securable vertical toolbox of claim 1, wherein the tool supporting fixtures include a multi-position shaft-type hand tool holder comprising:
   a support frame configured to be suspended from the peg board, the support frame including one or more slots along a bottom of the support frame; and
   a plurality of tool support blocks configured to be fastened to the support frame by fasteners extended through the one or more slots along the bottom of the support frame, each of the tool support blocks including a cavity configured to receive a distal end of a shaft-type hand tool.

10. The securable vertical toolbox of claim 1, wherein the tool supporting fixtures include an angled box-end wrench holder comprising:
- a mounting plate configured to be suspended from the peg board; and
- a wrench support plate extending from the mounting plate at an angle in the range of 30 to 60 degrees off a mounting plane of the mounting plate, the wrench support plate including a plurality of hooks for hanging box-end wrenches therefrom.

* * * * *